United States Patent
Patel et al.

(10) Patent No.: US 10,306,590 B2
(45) Date of Patent: May 28, 2019

(54) PAGING FOR MMW SHARED RADIO FREQUENCY SPECTRUM BANDS

(71) Applicant: QUALCOMM Incorporated, San Diego, CA (US)

(72) Inventors: Chirag Patel, San Diego, CA (US); Tao Luo, San Diego, CA (US); Arumugam Chendamarai Kannan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/674,372

(22) Filed: Aug. 10, 2017

(65) Prior Publication Data
US 2018/0242276 A1    Aug. 23, 2018

Related U.S. Application Data

(60) Provisional application No. 62/461,679, filed on Feb. 21, 2017.

(51) Int. Cl.
*H04W 68/00* (2009.01)
*H04W 68/02* (2009.01)
(Continued)

(52) U.S. Cl.
CPC .......... *H04W 68/02* (2013.01); *H04L 5/0048* (2013.01); *H04W 16/14* (2013.01); *H04W 48/16* (2013.01);
(Continued)

(58) Field of Classification Search
CPC ... H04W 68/02; H04W 68/025; H04W 16/14; H04W 48/16; H04W 72/005;
(Continued)

(56) References Cited

U.S. PATENT DOCUMENTS

2011/0058505 A1\* 3/2011 Pan .................. H04J 11/005
                                                    370/280
2015/0296385 A1 10/2015 Zhang et al.
(Continued)

OTHER PUBLICATIONS

"3 Generation Partnership Project: Technical Specification Group Radio Access Network: Evolved Universal Terrestrial Radio Access (E-UTRA); User Equipment (UE) Procedures in Idle Mode (Release 14)", 3GPP Standard; 3GPP TS 36.304, 3RD Generation Partnership Project (3GPP), vol. RAN WG2, No. V14.1.0, Dec. 30, 2016 (Dec. 30, 2016), pp. 1-46, XP051230310, [retrieved on Dec. 30, 2016].

(Continued)

*Primary Examiner* — Khai M Nguyen
(74) *Attorney, Agent, or Firm* — Liem T. Do

(57) ABSTRACT

Methods, systems, and devices for wireless communication are described. The described techniques provide for transmitting, at a base station, a contention exempt broadcast paging message that includes partial paging information for a user equipment (UE), receiving a random access request message transmitted by a UE in response to the broadcast paging message, and transmitting a unicast paging message which includes complete paging information. The described techniques further provide for determining, at a base station, a first paging opportunity window (POW) and a second POW for a UE, performing a LBT procedure during the first POW, transmitting a broadcast paging message including partial paging information for the UE during the first POW, performing a second LBT procedure during the second POW, transmitting a unicast paging message to the UE during the second POW, the unicast paging message including complete paging information for the UE.

30 Claims, 21 Drawing Sheets

(51) Int. Cl.
  *H04W 48/16* (2009.01)
  *H04L 5/00* (2006.01)
  *H04W 74/08* (2009.01)
  *H04W 72/00* (2009.01)
  *H04W 16/14* (2009.01)

(52) U.S. Cl.
  CPC ....... *H04W 68/025* (2013.01); *H04W 72/005* (2013.01); *H04W 74/0833* (2013.01); *H04L 5/0023* (2013.01); *H04W 74/0808* (2013.01)

(58) Field of Classification Search
  CPC .......... H04W 74/0833; H04W 74/0808; H04L 5/0048; H04L 5/0023
  See application file for complete search history.

(56) References Cited

U.S. PATENT DOCUMENTS

| | | | |
|---|---|---|---|
| 2016/0057731 A1* | 2/2016 | Damnjanovic | H04W 68/005 455/458 |
| 2016/0234804 A1* | 8/2016 | Hu | H04W 68/02 |
| 2016/0344526 A1* | 11/2016 | Fan | H04L 5/0048 |
| 2017/0013479 A1* | 1/2017 | Sun | H04W 24/02 |
| 2018/0213386 A1* | 7/2018 | Kim | H04J 11/0073 |
| 2018/0249374 A1* | 8/2018 | Park | H04J 11/00 |

OTHER PUBLICATIONS

Partial International Search Report—PCT/US2018/018333—ISA/EPO—Jun. 7, 2018 (171799WO).
International Search Report and Written Opinion—PCT/US2018/018333—ISA/EPO—Jul. 30, 2018 (171799WO).

\* cited by examiner

PAGING FOR MMW SHARED RADIO FREQUENCY SPECTRUM BANDS

CROSS REFERENCES

The present application for patent claims priority to U.S. Provisional Patent Application No. 62/461,679 by Patel, et al., entitled "PAGING FOR MMW SHARED RADIO FREQUENCY SPECTRUM BANDS," filed Feb. 21, 2017, assigned to the assignee hereof.

BACKGROUND

The following relates generally to wireless communication, and more specifically to paging for millimeter wave (mmW) shared radio frequency spectrum band.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations or access network nodes, each simultaneously supporting communication for multiple communication devices, which may be otherwise known as user equipment (UE).

When a base station has information to transmit to a UE in a power saving mode (e.g., idle mode), the base station may transmit a paging message to prompt the UE to enter a connected state to receive the information. Paging messages are typically broadcast on a channel that is received by a group of multiple UEs. In some cases, mmW transmissions may be directional transmissions to improve coverage. Due to the directionality of these mmW transmissions, wireless communications systems operating in a mmW spectrum may use beam sweeping to transmit broadcast messages in multiple directions. Because beam sweeping involves redundant transmissions in different directions, fewer time resources are available for each broadcast transmission. Given these time limitations, a single mmW broadcast may provide enough time to send a full set of paging information to a UE.

SUMMARY

The described techniques relate to improved methods, systems, devices, or apparatuses that support paging for mmW shared radio frequency spectrum bands. Generally, the described techniques provide for transmitting, at a base station, a contention exempt broadcast paging message that includes partial paging information for a user equipment (UE) over a shared radio frequency spectrum band. In some examples, the base station may transmit the contention exempt broadcast paging message during a contention exempt transmission (CET) period. The broadcast paging message may be transmitted concurrent with a transmission of a broadcast discovery reference signal (DRS), which may include one or more synchronization channels and broadcast channels to enable system acquisition. A UE may receive the broadcast paging message and may respond by transmitting a random access request message. In some examples, the UE may transmit a contention exempt random access request message, (e.g., transmit a random access request message during a CET). Alternatively, the UE may transmit the random access request after performing a LBT procedure. The LBT procedure may be a shortened LBT procedure, and may be performed during a contention gap which precedes the transmission of the random access request message. The base station may receive the random access request and may transmit a unicast paging message which includes complete paging information for the UE.

Some examples of the described techniques provide for determining, at a base station, a first paging opportunity window (POW) and a second POW for a UE. Each POW window may include multiple transmission time intervals (TTIs). During the first POW, the base station may perform a LBT procedure to gain access to a shared radio frequency spectrum band during the first POW, and may then transmit a broadcast paging message including partial paging information for the UE. The UE may power on a receive chain during the first POW to receive the broadcast paging message. During the second POW, the base station may perform a second LBT procedure to gain access to the shared radio frequency spectrum band and transmit a unicast paging message to the UE. The unicast paging message may include complete paging information for the UE. During the second POW, the UE may power on a receive chain, based on the received broadcast paging message, to receive the unicast paging message.

A method of wireless communication is described. The method may include transmitting a contention exempt broadcast paging message comprising partial paging information for a UE over a shared radio frequency spectrum band concurrent with a transmission of a broadcast discovery reference signal (DRS), receiving, in response to the broadcast paging message, a random access request message, and transmitting, based on the received random access request message, a unicast paging message comprising complete paging information for the UE.

An apparatus for wireless communication is described. The apparatus may include means for transmitting a contention exempt broadcast paging message comprising partial paging information for a UE over a shared radio frequency spectrum band concurrent with a transmission of a DRS, means for receiving, in response to the broadcast paging message, a random access request message, and means for transmitting, based on the received random access request message, a unicast paging message comprising complete paging information for the UE.

Another apparatus for wireless communication is described. The apparatus may include a processor, memory in electronic communication with the processor, and instructions stored in the memory. The instructions may be operable to cause the processor to transmit a contention exempt broadcast paging message comprising partial paging information for a UE over a shared radio frequency spectrum band concurrent with a transmission of a DRS, receive, in response to the broadcast paging message, a random access request message, and transmit, based on the received random access request message, a unicast paging message comprising complete paging information for the UE.

A non-transitory computer readable medium for wireless communication is described. The non-transitory computer-readable medium may include instructions operable to cause a processor to transmit a contention exempt broadcast paging message comprising partial paging information for a UE over a shared radio frequency spectrum band concurrent with a transmission of a DRS, receive, in response to the broadcast paging message, a random access request message, and transmit, based on the received random access request message, a unicast paging message comprising complete paging information for the UE.

In some examples of the method, apparatus, and non-transitory computer-readable medium described above, transmitting the broadcast paging message further comprises: staggering broadcast paging messages for different UEs across different CET periods.

In some examples of the method, apparatus, and non-transitory computer-readable medium described above, transmitting the contention exempt broadcast paging message comprises: frequency domain multiplexing the contention exempt broadcast paging message with the DRS.

In some examples of the method, apparatus, and non-transitory computer-readable medium described above, transmitting the contention exempt broadcast paging message further comprises: including in the broadcast DRS an indication of a CET random access channel (RACH) location for the UE.

In some examples of the method, apparatus, and non-transitory computer-readable medium described above, transmitting the contention exempt broadcast paging message comprises: performing beam sweeping to transmit a plurality of copies of the contention exempt broadcast paging message on different beams.

In some examples of the method, apparatus, and non-transitory computer-readable medium described above, the partial paging information comprises an indication that the unicast paging message may be to be transmitted to the UE.

Some examples of the method, apparatus, and non-transitory computer-readable medium described above may further include processes, features, means, or instructions for transmitting the unicast paging message further comprises performing a listen before talk (LBT) to gain access to the shared radio frequency spectrum band during a paging opportunity window (POW) associated with the UE for the unicast paging message.

In some examples of the method, apparatus, and non-transitory computer-readable medium described above, the POW comprises multiple transmission time intervals (TTIs).

In some examples of the method, apparatus, and non-transitory computer-readable medium described above, the complete paging information comprises an indication of downlink resources associated with a future transmission from the base station to the UE.

A method of wireless communication is described. The method may include receiving a contention exempt broadcast paging message comprising partial paging information for a UE over a shared radio frequency spectrum band during a contention exempt transmission (CET) period and concurrent with a reception of a broadcast discovery reference signal (DRS), transmitting, in response to the received contention exempt broadcast paging message, a random access request message, and receiving, based on the transmitted random access request, a unicast paging message comprising complete paging information for the UE.

An apparatus for wireless communication is described. The apparatus may include means for receiving a contention exempt broadcast paging message comprising partial paging information for a UE over a shared radio frequency spectrum band during a CET period and concurrent with a reception of a broadcast DRS, means for transmitting, in response to the received contention exempt broadcast paging message, a random access request message, and means for receiving, based on the transmitted random access request, a unicast paging message comprising complete paging information for the UE.

Another apparatus for wireless communication is described. The apparatus may include a processor, memory in electronic communication with the processor, and instructions stored in the memory. The instructions may be operable to cause the processor to receive a contention exempt broadcast paging message comprising partial paging information for a UE over a shared radio frequency spectrum band during a CET period and concurrent with a reception of a broadcast DRS, transmit, in response to the received contention exempt broadcast paging message, a random access request message, and receive, based on the transmitted random access request, a unicast paging message comprising complete paging information for the UE.

A non-transitory computer readable medium for wireless communication is described. The non-transitory computer-readable medium may include instructions operable to cause a processor to receive a contention exempt broadcast paging message comprising partial paging information for a UE over a shared radio frequency spectrum band during a CET period and concurrent with a reception of a broadcast DRS, transmit, in response to the received contention exempt broadcast paging message, a random access request message, and receive, based on the transmitted random access request, a unicast paging message comprising complete paging information for the UE.

In some examples of the method, apparatus, and non-transitory computer-readable medium described above, the contention exempt broadcast paging message may be staggered for different UEs across different CET periods.

In some examples of the method, apparatus, and non-transitory computer-readable medium described above, the contention exempt broadcast paging message may be frequency domain multiplexed with the DRS.

In some examples of the method, apparatus, and non-transitory computer-readable medium described above, receiving the contention exempt broadcast paging message further comprises: obtaining from the broadcast DRS an indication of a CET random access channel (RACH) location for the UE.

In some examples of the method, apparatus, and non-transitory computer-readable medium described above, the partial paging information comprises an indication that the unicast paging message may be to be transmitted to the UE.

In some examples of the method, apparatus, and non-transitory computer-readable medium described above, the random access request message comprises a CET.

In some examples of the method, apparatus, and non-transitory computer-readable medium described above, transmitting the random access request message further comprises: performing a listen before talk (LBT) procedure to gain access to the shared radio frequency spectrum band prior to transmitting the random access request message.

In some examples of the method, apparatus, and non-transitory computer-readable medium described above, transmitting the random access request message further comprises: performing the LBT procedure during a contention gap preceding the transmission of the random access request message.

In some examples of the method, apparatus, and non-transitory computer-readable medium described above, receiving the unicast paging message further comprises: determining a paging opportunity window (POW) associated with the unicast paging message. Some examples of the method, apparatus, and non-transitory computer-readable medium described above may further include processes, features, means, or instructions for powering on a receive chain of the UE during the POW.

In some examples of the method, apparatus, and non-transitory computer-readable medium described above, the POW comprises multiple transmission time intervals (TTIs).

In some examples of the method, apparatus, and non-transitory computer-readable medium described above, the complete paging information comprises an indication of downlink resources associated with a future transmission from the base station to the UE.

In some examples of the method, apparatus, and non-transitory computer-readable medium described above, the transmission of the unicast paging message may be beam-specific.

A method of wireless communication is described. The method may include determining a first paging opportunity window (POW) and a second POW for a UE, each of the first POW and the second POW comprising multiple transmission time intervals (TTIs), performing a first listen-before-talk (LBT) procedure to gain access to a shared radio frequency spectrum band during the first POW, transmitting a broadcast paging message over the shared radio frequency spectrum band during the first POW based on the first LBT procedure, the broadcast paging message comprising partial paging information for the UE, performing a second LBT procedure to gain access to the shared radio frequency spectrum band during the second POW, and transmitting a unicast paging message to the UE over the shared radio frequency spectrum band during the second POW based on the second LBT procedure, the unicast paging message comprising complete paging information for the UE.

An apparatus for wireless communication is described. The apparatus may include means for determining a first POW and a second POW for a UE, each of the first POW and the second POW comprising multiple TTIs, means for performing a first LBT procedure to gain access to a shared radio frequency spectrum band during the first POW, means for transmitting a broadcast paging message over the shared radio frequency spectrum band during the first POW based on the first LBT procedure, the broadcast paging message comprising partial paging information for the UE, means for performing a second LBT procedure to gain access to the shared radio frequency spectrum band during the second POW, and means for transmitting a unicast paging message to the UE over the shared radio frequency spectrum band during the second POW based on the second LBT procedure, the unicast paging message comprising complete paging information for the UE.

Another apparatus for wireless communication is described. The apparatus may include a processor, memory in electronic communication with the processor, and instructions stored in the memory. The instructions may be operable to cause the processor to determine a first POW and a second POW for a UE, each of the first POW and the second POW comprising multiple TTIs, perform a LBT procedure to gain access to a shared radio frequency spectrum band during the first POW, transmit a broadcast paging message over the shared radio frequency spectrum band during the first POW based on the first LBT procedure, the broadcast paging message comprising partial paging information for the UE, perform a second LBT procedure to gain access to the shared radio frequency spectrum band during the second POW, and transmit a unicast paging message to the UE over the shared radio frequency spectrum band during the second POW based on the second LBT procedure, the unicast paging message comprising complete paging information for the UE.

A non-transitory computer readable medium for wireless communication is described. The non-transitory computer-readable medium may include instructions operable to cause a processor to determine a first POW and a second POW for a UE, each of the first POW and the second POW comprising multiple TTIs, perform a LBT procedure to gain access to a shared radio frequency spectrum band during the first POW, transmit a broadcast paging message over the shared radio frequency spectrum band during the first POW based on the first LBT procedure, the broadcast paging message comprising partial paging information for the UE, perform a second LBT procedure to gain access to the shared radio frequency spectrum band during the second POW, and transmit a unicast paging message to the UE over the shared radio frequency spectrum band during the second POW based on the second LBT procedure, the unicast paging message comprising complete paging information for the UE.

In some examples of the method, apparatus, and non-transitory computer-readable medium described above, transmitting the broadcast paging message further comprises: staggering broadcast paging messages for different UEs across different POWs.

In some examples of the method, apparatus, and non-transitory computer-readable medium described above, the partial paging information comprises an indication that the unicast paging message may be to be transmitted to the UE.

In some examples of the method, apparatus, and non-transitory computer-readable medium described above, the second POW comprises multiple TTIs.

In some examples of the method, apparatus, and non-transitory computer-readable medium described above, the unicast paging message may be transmitted on multiple beams.

In some examples of the method, apparatus, and non-transitory computer-readable medium described above, the complete paging information comprises an indication of downlink resources associated with a future transmission from the base station to the UE.

A method of wireless communication is described. The method may include determining a first paging opportunity window (POW) comprising multiple transmission time intervals (TTIs), powering on a receive chain during the first POW to receive a broadcast paging message during the first POW, the broadcast paging message comprising partial paging information for a UE, and powering on a receive chain, based on the received broadcast paging message, during a second POW to receive a unicast paging message, the unicast paging message comprising complete paging information for the UE.

An apparatus for wireless communication is described. The apparatus may include means for determining a first POW comprising multiple TTIs, means for powering on a receive chain during the first POW to receive a broadcast paging message during the first POW, the broadcast paging message comprising partial paging information for a UE, and means for powering on a receive chain, based on the received broadcast paging message, during a second POW to receive a unicast paging message, the unicast paging message comprising complete paging information for the UE.

Another apparatus for wireless communication is described. The apparatus may include a processor, memory in electronic communication with the processor, and instructions stored in the memory. The instructions may be operable to cause the processor to determine a first POW comprising multiple TTIs, power on a receive chain during the first POW to receive a broadcast paging message during the first POW, the broadcast paging message comprising partial paging information for a UE, and power on a receive chain, based on the received broadcast paging message, during a second POW to receive a unicast paging message, the unicast paging message comprising complete paging information for the UE.

A non-transitory computer readable medium for wireless communication is described. The non-transitory computer-readable medium may include instructions operable to cause a processor to determine a first POW comprising multiple TTIs, power on a receive chain during the first POW to receive a broadcast paging message during the first POW, the broadcast paging message comprising partial paging information for a UE, and power on a receive chain, based on the received broadcast paging message, during a second POW to receive a unicast paging message, the unicast paging message comprising complete paging information for the UE.

In some examples of the method, apparatus, and non-transitory computer-readable medium described above, the broadcast paging message may be staggered for different UEs across different POWs.

In some examples of the method, apparatus, and non-transitory computer-readable medium described above, the partial paging information comprises an indication that the unicast paging message may be to be transmitted to the UE.

In some examples of the method, apparatus, and non-transitory computer-readable medium described above, the second POW comprises multiple TTIs.

In some examples of the method, apparatus, and non-transitory computer-readable medium described above, the unicast paging message may be transmitted on multiple beams.

DETAILED DESCRIPTION

Figure 1:
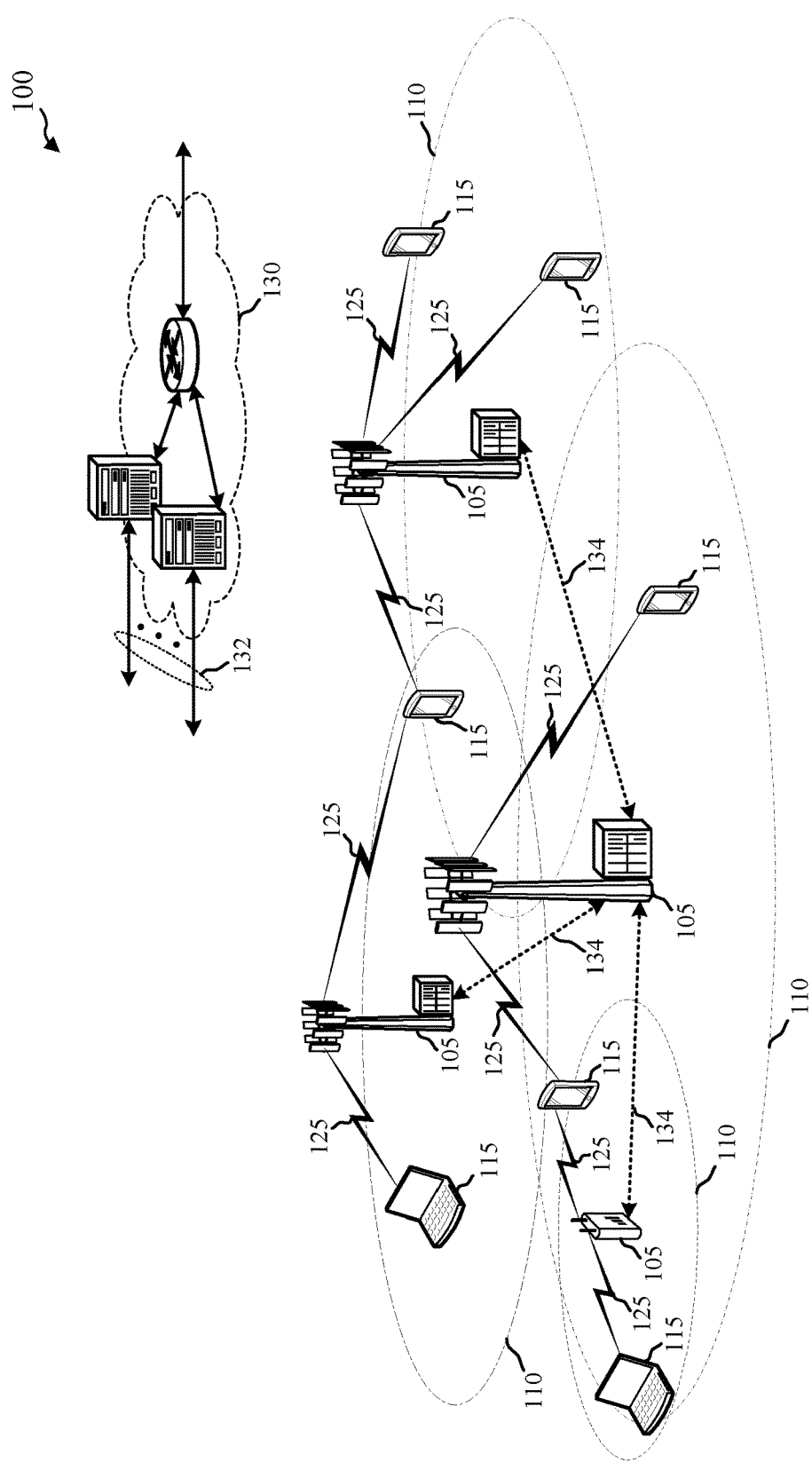
FIG. 1 illustrates an example of a system for wireless communication that supports paging for mmW shared radio frequency spectrum bands in accordance with aspects of the present disclosure.

In a millimeter wave (mmW) system, a base station may engage in a beam sweeping operation when information is broadcast for multiple user equipment (UEs). The base station may have some information to transmit to the UE, and the base station may transmit a paging related message to prompt the UE to enter a connected state to receive the information. However, when beam sweeping is used to transmit broadcast messages, given the time limitations of beam sweeping, complete paging information can be too long to broadcast in mmW systems. Instead, a base station may transmit a broadcast paging message carrying partial paging information.

In some examples, a base station and a UE may communicate in a shared spectrum. The base station and the UE may utilize a contention based protocol, such as a listen before talk (LBT) procedure, to efficiently communicate in the shared spectrum. A contention-based protocol is designed to prevent data collisions whereby multiple devices interfere with one another by communicating on the shared channel at the same (or overlapping) times on the same (or overlapping) frequencies. In an attempt to avoid such interference, a wireless device may perform a contention-based protocol prior to each transmission. For instance, a wireless device may listen to the shared channel to confirm that the shared channel is not currently being used before transmitting. However, when beam sweeping is used to transmit broadcast messages in a shared mmW spectrum, given the time limitations of beam sweeping, the transmitting device may not have sufficient time to perform a contention-based protocol (e.g., a LBT procedure). In some cases, performing a LBT procedure may cause a delay in the transmission of a paging message. Instead, the base station may transmit a contention exempt broadcast paging message. In some examples, the base station may transmit a broadcast paging message during a contention exempt transmission (CET) period. Transmitting a contention exempt broadcast paging message, instead of performing a LBT procedure, may allow for the transmission of the broadcast paging message without the delay caused by a LBT procedure. Furthermore, transmitting a contention exempt broadcast paging message may cause only minimal (e.g., tolerable) interference. The paging information may be mapped onto a discovery reference signal (DRS). The partial paging information may utilize minimal resources in time and frequency. For example, the partial paging information may include one or more bits indicating that the base station has information to transmit to the UE.

In response to receiving the broadcast paging message, the UE may transmit a random access request message. In some examples, the UE may transmit a contention exempt random access request signal. For example, the UE may transmit a random access request signal during a CET period. The timing of the CET may be indicated in the received discovery reference signal. Alternatively, the UE may perform a shortened LBT procedure prior to transmitting the random access request message. In such examples, a contention gap may exist prior to the transmission of random access request messages corresponding to different beams. In other examples, the base station may configure a beam sweeping sequence to maximize a spatial separation between beams, which may minimize the occurrence of a random access request messages from a different beam causing a failed LBT procedure for a UE attempting to transmit its own random access request message at the appointed time. This spatial separation between beams may allow the UE to perform a shortened LBT procedure without interfering with other UE transmissions, and without introducing a contention gap.

In response to receiving the random access request message, the base station may transmit a unicast paging message to the UE containing a complete set of paging information for the UE. The unicast paging message may be transmitted during a paging opportunity window (POW) for the UE containing multiple transmit time intervals (TTIs). The POW may be determined based on the broadcast paging message. During the POW, the UE may wake up to receive the unicast paging message. The complete set of paging information in the unicast paging message may include paging parameters or other information that is not present in the broadcast paging message, such as an indication of downlink resources for additional unicast transmissions to the UE, a request for uplink transmissions (e.g., a keep-alive message) or an indication of resources for an uplink transmission (e.g., resources for scheduling request, a small uplink data transmission, etc.).

In other examples, the base station may determine a first POW and a second POW for a UE. The base station may perform a first LBT procedure to gain access to the shared radio frequency spectrum band during the first POW, then transmit a broadcast paging message with partial paging information for the UE during the first POW based on the first LBT procedure. The base station may then perform a second LBT procedure to gain access to the shared radio frequency spectrum band during the second POW and transmit a unicast paging message to the UE over the shared radio frequency spectrum band during the second POW based on the second LBT procedure. The unicast paging message may include complete paging information for the UE.

Aspects of the disclosure are initially described in the context of a wireless communications system. Aspects of the disclosure are illustrated by examples of wireless communication systems, and process flows for paging in a mmW system in shared radio frequency spectrum band. Aspects of the disclosure are further illustrated by and described with reference to apparatus diagrams, system diagrams, and flowcharts that relate to paging in a mmW shared radio frequency spectrum band.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a LTE (or LTE-Advanced) network, or a New Radio (NR) network. In some cases, wireless communications system 100 may support enhanced broadband communications, ultra-reliable (i.e., mission critical) communications, low latency communications, and communications with low-cost and low-complexity devices. Wireless communications system 100 may support improved paging in a mmW unlicensed spectrum.

Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105, or downlink transmissions, from a base station 105 to a UE 115. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a TTI of a downlink channel may be distributed between different control regions in a cascaded manner (e.g., between a common control region and one or more UE-specific control regions).

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, or the like.

In some cases, a UE 115 may also be able to communicate directly with other UEs (e.g., using a peer-to-peer (P2P) or device-to-device (D2D) protocol). One or more of a group of UEs 115 utilizing D2D communications may be within the geographic coverage area 110 of a cell. Other UEs 115 in such a group may be outside the geographic coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independent of a base station 105.

Some UEs 115, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station without human intervention. MTC devices may also be configured to enter a power saving "deep sleep" mode when not engaging in active communications. In some cases, MTC or IoT devices may be designed to support mission critical functions and wireless communications system may be configured to provide ultra-reliable communications for these functions.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

A base station 105 may be connected by an S1 interface to the core network 130. The core network may be an evolved packet core (EPC), which may include at least one mobility management entity (MME), at least one S-GW, and at least one P-GW. The MME may be the control node that processes the signaling between the UE 115 and the EPC. All user IP packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service (PSS).

The core network 130 may provide user authentication, access authorization, tracking, Internet Protocol (IP) connectivity, and other access, routing, or mobility functions. At least some of the network devices, such as base stations 105 may include subcomponents such as an access network entity, which may be an example of an access node controller (ANC). Each access network entity may communicate with a number of UEs 115 through a number of other access network transmission entities, each of which may be an example of a smart radio head, or a transmission/reception point (TRP). In some configurations, a TRP may be an example of a base station. In some configurations, various functions of each access network entity or base station 105 may be distributed across various network devices (e.g., radio heads and access network controllers) or consolidated into a single network device (e.g., a base station 105).

In some cases, wireless communications system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than ultra-high frequency (UHF) antennas. In some cases, this may facilitate use of antenna arrays within a UE 115 (e.g., for directional beamforming). However, EHF transmissions may be subject to even greater atmospheric attenuation and shorter range than UHF transmissions.

Thus, wireless communications system 100 may support millimeter wave (mmW) communications between UEs 115 and base stations 105. Devices operating in mmW or EHF bands may have multiple antennas to allow beamforming. That is, a base station 105 may use multiple antennas or antenna arrays to conduct beamforming operations for directional communications with a UE 115. Beamforming (which may also be referred to as spatial filtering or directional transmission) is a signal processing technique that may be used at a transmitter (e.g., a base station 105) to shape and/or steer an overall antenna beam in the direction of a target receiver (e.g., a UE 115). This may be achieved by combining elements in an antenna array in such a way that transmitted signals at particular angles experience constructive interference while others experience destructive interference.

Multiple-input multiple-output (MIMO) wireless communications systems use a transmission scheme between a transmitter (e.g., a base station) and a receiver (e.g., a UE), where both transmitter and receiver are equipped with multiple antennas. Some portions of wireless communications system 100 may use beamforming. For example, base station 105 may have an antenna array with a number of rows and columns of antenna ports that the base station 105 may use for beamforming in its communication with UE 115. Signals may be transmitted multiple times in different directions (e.g., each transmission may be beamformed differently). A mmW receiver (e.g., a UE 115) may try multiple beams (e.g., antenna subarrays) while receiving the synchronization signals.

In some cases, the antennas of a base station 105 or UE 115 may be located within one or more antenna arrays, which may support beamforming or MIMO operation. One or more base station antennas or antenna arrays may be collocated at an antenna assembly, such as an antenna tower. In some cases, antennas or antenna arrays associated with a base station 105 may be located in diverse geographic locations. A base station 105 may use multiple antennas or antenna arrays to conduct beamforming operations for directional communications with a UE 115.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use Hybrid ARQ (HARM) to provide retransmission at the MAC layer to improve link efficiency. In the control plane, the Radio Resource Control (RRC) protocol layer may provide establishment, configuration, and maintenance of an RRC connection between a UE 115 and a base station 105-c, base station 105-b, or core network 130 supporting radio bearers for user plane data. At the Physical (PHY) layer, transport channels may be mapped to physical channels.

Time intervals in LTE or NR may be expressed in multiples of a basic time unit (which may be a sampling period of $T_s=1/30,720,000$ seconds). Time resources may be organized according to radio frames of length of 10 ms ($T_f=307200T_s$), which may be identified by a system frame number (SFN) ranging from 0 to 1023. Each frame may include ten 1 ms subframes numbered from 0 to 9. A subframe may be further divided into two 0.5 ms slots, each of which contains 6 or 7 modulation symbol periods (depending on the length of the cyclic prefix prepended to each symbol). Excluding the cyclic prefix, each symbol contains 2048 sample periods. In some cases the subframe may be the smallest scheduling unit, also known as a transmission time interval (TTI). In other cases, a TTI may be shorter than a subframe or may be dynamically selected (e.g., in short TTI bursts or in selected component carriers using short TTIs).

A resource element may include one symbol period and one subcarrier (e.g., a 15 KHz frequency range). A resource block may contain 12 consecutive subcarriers in the frequency domain and, for a normal cyclic prefix in each OFDM symbol, 7 consecutive OFDM symbols in the time domain (1 slot), or 84 resource elements. The number of bits carried by each resource element may depend on the modulation scheme (the configuration of symbols that may be selected during each symbol period). Thus, the more resource blocks that a UE receives and the higher the modulation scheme, the higher the data rate may be.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

In some cases, wireless communications system 100 may utilize enhanced component carriers (eCCs). An eCC may be characterized by one or more features including: wider bandwidth, shorter symbol duration, shorter transmission time interval (TTIs), and modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared radio frequency spectrum band (where more than one operator is allowed to use the spectrum). In some cases, the shared radio frequency spectrum band may be spectrum band utilized in a new radio (NR) shared spectrum system. An eCC characterized by wide bandwidth may include one or more segments that may be utilized by UEs 115 that are not capable of monitoring the whole bandwidth or prefer to use a limited bandwidth (e.g., to conserve power).

In some cases, an eCC may utilize a different symbol duration than other CCs, which may include use of a reduced symbol duration as compared with symbol durations of the other CCs. A shorter symbol duration may be associated with increased subcarrier spacing. A TTI in an eCC may include one or multiple symbols. In some cases, the TTI duration (that is, the number of symbols in a TTI) may be variable. A device, such as a UE 115 or base station 105, utilizing eCCs may transmit wideband signals (e.g., 20, 40, 60, 80 MHz, etc.) at reduced symbol durations (e.g., 16.67 microseconds).

In some cases, wireless communications system 100 may utilize both licensed and unlicensed radio frequency spectrum bands. For example, wireless communications system 100 may employ LTE License Assisted Access (LTE-LAA) or LTE Unlicensed (LTE U) radio access technology or NR technology in an unlicensed band such as shared radio frequency spectrum band. When operating in unlicensed radio frequency spectrum bands, wireless devices such as base stations 105 and UEs 115 may employ listen-before-talk (LBT) procedures to ensure the channel is clear before transmitting data. In some cases, operations in unlicensed bands may be based on a carrier aggregation (CA) configuration in conjunction with component carriers (CCs) operating in a licensed band. Operations in unlicensed spectrum may include downlink transmissions, uplink transmissions, or both. Duplexing in unlicensed spectrum may be based on frequency division duplexing (FDD), time division duplexing (TDD) or a combination of both.

The described techniques relate to improved methods, systems, devices, or apparatuses that support paging for mmW shared radio frequency spectrum band. Generally, the described techniques provide for transmitting, at base station 105, a contention exempt broadcast paging message that includes partial paging information for a UE 115 over a shared radio frequency spectrum band. In some examples, base station 105 may transmit a broadcast paging message during a contention exempt transmission (CET) period. The broadcast paging message may be transmitted concurrent with a transmission of a broadcast discovery reference signal (DRS). UE 115 may receive the broadcast paging message and may respond by transmitting a random access request message. UE 115 may transmit a contention exempt random access request message, or may transmit a random access request message during a CET. Alternatively, UE 115 may transmit the random access request after performing a LBT procedure. The LBT procedure may be a shortened LBT procedure, and may be performed during a contention gap which precedes the transmission of the random access request message. Base station 105 may receive the random access request and may transmit a unicast paging message which includes complete paging information for UE 115.

In some examples of the described techniques provide for determining, at a base station 105, a first POW and a second POW for a UE 115. Each POW window may include multiple transmission time intervals (TTIs). During the first POW, base station 105 may perform a LBT procedure to gain access to a shared radio frequency spectrum band during the first POW, and may then transmit a broadcast paging message including partial paging information for UE 115. UE 115 may power on a receive chain during the first POW to receive the broadcast paging message. During the second POW, base station 105 may perform a second LBT procedure to gain access to the shared radio frequency spectrum band and transmit a unicast paging message to UE 115. The unicast paging message may include complete paging information for UE 115. During the second POW, UE 115 may power on a receive chain, based on the received broadcast paging message, to receive the unicast paging message.

Figure 2:
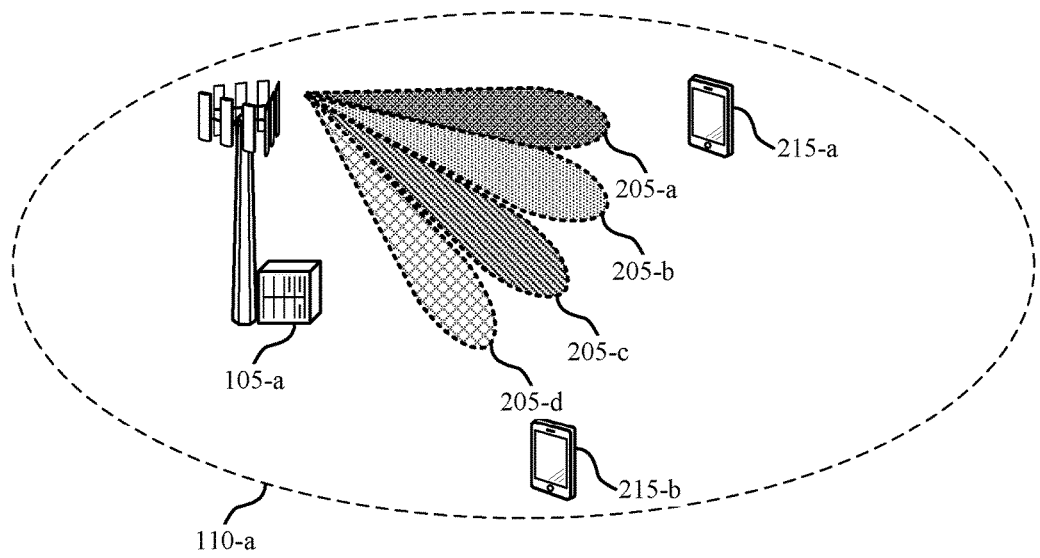
FIG. 2 illustrates an example of a wireless communications system that supports paging for mmW shared radio frequency spectrum bands in accordance with aspects of the present disclosure.

FIG. 2 illustrates an example of a wireless communications system 200 that supports paging for mmW shared radio frequency spectrum band in accordance with various aspects of the present disclosure. Wireless communications system 200 may include a first UE 115-a, a second UE 115-b, and a base station 105-a, which may be examples of the corresponding devices described with reference to FIG. 1.

In a mmW system, base station 105-a and UEs 115, such as UE 115-a and UE 115-b, may utilize directional transmissions for communications. Base station 105-a may have information to transmit to, for example, UE 115-a, which may be in a power saving mode (e.g., idle mode). Base station 105-a may transmit a paging message to prompt UE 115-a to enter a connected state to receive the information. In some cases base station 105-a may not be aware of the location of UE 115-a, and therefore may not know in which direction to transmit to UE 115-a. Thus, in the event that paging information is to be transmitted to the UEs 115, the base station 105-a may transmit multiple messages in a beam sweeping manner (e.g., by sweeping through a set of beams). For example, base station 105-a may transmit a message on beam 205-a, 205-b, 205-c, and 205-d. Each message may be transmitted in a different direction and on a different beam. However, because beam sweeping involves redundant transmissions in different directions, fewer time resources are available for each broadcast transmission. Thus the length of the broadcast transmission may be constrained by time limitations. In some cases, resources allocated to a broadcast message using beam sweeping may not be sufficient to carry complete paging information for UE 115-a.

Base station 105-a may transmit a directional broadcast paging message along multiple beams (e.g., beams 205-a, 205-b, 205-c, and 205-d). Each broadcast paging message may be transmitted in a different direction and on a different beam 205 in order to cover a portion of or all of geographic coverage area 110 of base station 105-a. For example, base station 105-a may transmit the broadcast paging message over first beam 205-a in a first transmission time interval (TTI), the broadcast paging message over second beam 205-b in a second TTI, the broadcast paging message over third beam 205-c in a third TTI, and the directional broadcast paging message over fourth beam 205-d in a fourth TTI. It should be understood that base station 105-a may transmit any number of directional messages without departing from the scope of the disclosure.

The broadcast paging message may include partial paging information. The partial paging information may utilize fewer resources in time and frequency than complete paging information. For example, the partial paging information may include one or more bits indicating that the BS has information to transmit to UE 115-a. The partial paging information may also include an indication that base station 105-a may transmit a unicast paging message including complete paging information at some later time.

In some examples, the broadcast paging message may be transmitted concurrent with a discovery reference signal (DRS). The DRS may include, for example, a first physical broadcast channel (PBCH), a primary synchronization signal (PSS), a secondary synchronization signal (SSS), and a second PBCH. The broadcast paging message may be mapped to a first DRS corresponding to first beam 205-a. Base station 105-a may perform beam sweeping to transmit a plurality of copies of the broadcast paging message, and each broadcast paging message may be mapped to a DRS.

Base station 105-a may transmit a contention exempt broadcast paging message. For example, base station 105-a may transmit the directional broadcast paging messages during contention exempt transmission (CET) periods. During a CET period, base station 105-a does not contend for access (e.g., perform a listen before talk (LBT) procedure) to the shared radio frequency spectrum band. In some examples, base station 105-a may stagger the broadcast paging messages for different UEs 115 (e.g., UE 115-a and UE 115-b) across different CETs. Different UEs may receive the broadcast paging messages that correspond to specific times. In some examples, UE 115-a may receive a message corresponding to its staggered time by hashing a messages that correspond to specific TTI. For example, UE 115-a may hash to a first TTI (e.g., SFN=0), and may receive the broadcast paging message at the first TTI. UE 115-b may hash to a second TTI (e.g., SFN=40), and may receive the broadcast paging message at the second time. A third UE (not shown) may hash to a third TTI (e.g., SFN=80), and may receive the broadcast paging message at the third time, and so on for multiple UEs 115 within geographic coverage area 110. In some examples, multiple UEs 115 may hash to the first time, multiple UEs 115 may hash to the second time, etc., such that UEs 115 located within geographic coverage area 110 are divided into groups that correspond to staggered time intervals.

Base station 105-a may transmit the broadcast paging message including the partial paging information on first beam 205-a. In some cases, base station 105-a may map the partial paging information to a DRS, and the DRS may include information regarding the location of a CET random access channel (RACH) for UE 115-a. In response, UE 115-a may enter a connected state and obtain from the broadcast DRS an indication of a CET RACH location, and transmit the random access request message during the indicated CET period on first beam 205-a.

In some examples, UE 115-a may contend for access to the shared radio frequency spectrum band by performing a LBT procedure prior to transmitting the random access request message. UE 115-a may perform a shortened LBT procedure. For example, the UE may be capable of performing both extended clear channel access (eCCA) procedures and single CCA procedures. During the eCCA procedure, the UE may perform multiple separate measurements of the channel at multiple instances during a monitoring period to contend for access to the channel. By contrast, during the single CCA procedure the UE may monitor the channel only once during a monitoring period. The monitoring period for the single CCA procedure may be shorter than the monitoring period for the eCCA procedure. In this example, the single CCA procedure may correspond to the shortened LBT procedure, and the eCCA may correspond to a full LBT procedure. Additionally or alternatively, the shortened LBT procedure may correspond to the use of a shorter time period for channel monitoring time than is used for a full LBT procedure, irrespective of the number of measurements performed during the period.

After performing the shortened LBT procedure, UE 115-a may transmit the random access request message via first beam 205-a. UE 115-a may perform a LBT procedure during a contention gap, which may be introduced prior to each RACH opportunity. Thus, a RACH opportunity which is preceded by a contention gap maybe distinct from a RACH opportunity which is utilized for initial access, handover, or other operations. For example, a first contention gap may precede a RACH opportunity corresponding to first beam 205-a, a second contention gap may precede a RACH opportunity corresponding to second beam 205-b, a third contention gap may precede a RACH opportunity corresponding to third beam 205-c, and a fourth contention gap may precede a RACH opportunity corresponding to fourth beam 205-d. In such examples, UE 115-a may perform a LBT procedure to gain access to the shared radio frequency spectrum band during the introduced contention gap, and transmit a random access request message on beam 205-a. UE 115-b may also perform a LBT procedure during its corresponding introduced contention gap. The transmission of a random access request message by UE 115-a may not cause the LBT procedure performed by UE 115-d to fail, because of the location of the introduced contention gaps.

Alternatively or additionally, base station 105-a may configure a beam sweeping sequence to maximize a spatial separation between beams. For example, first beam 205-a may be the first beam in a beam sweeping procedure. Fourth beam 205-d may be the second beam in a beam sweeping procedure. In response to the broadcast paging signal received via first beam 205-a and fourth beam 205-d, UE 115-a and UE 115-b may transmit a random access request message. UE 115-a may perform a LBT procedure prior to transmitting the random access request message on first beam 205-a. UE 115-b may then perform a LBT procedure prior to transmitting the random access request message on fourth beam 205-d. However, because of the sequence of beams and the resulting maximized spatial separation, the transmission of the random access request message by UE 115-*a* will not cause the LBT procedure performed by UE 115-*b* for fourth beam 205-*d* to fail.

Base station 105-*a* may receive a random access request message from UE 115-*a* over beam 205-*a*, and in response may transmit a beam-specific unicast paging message to UE 115-*a* via beam 205-*a*. The unicast paging message may include complete paging information for UE 115-*a*. The complete paging information may include, for example, paging parameters or other information that is not present in the broadcast paging message, such as an indication of downlink resources for additional unicast transmissions to UE 115-*a*, a request for uplink transmissions (e.g., a keep-alive message) or an indication of resources for an uplink transmission (e.g., resources for scheduling request, a small uplink data transmission, etc.). Base station 105-*a* may transmit the unicast paging message during a POW for UE 115-*a*.

In some examples, the POW may contain multiple TTIs, and may be determined based on the broadcast paging message previously transmitted to UE 115-*a*. Base station 105-*a* may perform a LBT procedure during a first TTI of the POW. In some examples, the LBT may succeed, and base station 105-*a* may transmit the unicast paging message during the first TTI of the POW. In such examples, UE 115-*a* may receive the unicast paging message during the first TTI of the POW, and may then enter a power saving mode (e.g., idle mode) for the duration of the POW. Alternatively, base station 105-*a* may perform a LBT procedure during the first TTI of the POW, and the LBT procedure may fail. In such examples, base station 105-*a* may perform a second LBT procedure during the second TTI of the POW. If the second LBT procedure is successful, then base station 105-*a* may transmit the unicast paging message to UE 115-*a*. If the second LBT procedure fails, then base station 105-*a* may continue to perform LBT procedures during successive TTIs of the POW until it obtains access to the shared radio frequency spectrum band. Because the POW contains multiple TTIs, base station 105-*a* may gain access to the shared radio frequency spectrum band and transmit the unicast paging message to UE 115-*a* during the POW, even if a first LBT procedure, second LBT procedure, or more LBT procedures fail.

In some cases, base station 105-*a* may contend for access to the shared radio frequency spectrum band (e.g., perform a LBT procedure) prior to transmitting both the broadcast paging message and the unicast paging message. In such cases, UE 115-*a* may not transmit a random access request message in response to the broadcast paging message. Base station 105-*a* may determine a first POW and a second POW corresponding to UE 115-*a*. Both the first POW and the second POW may contain multiple TTIs. Base station 105-*a* may perform a LBT procedure during the first POW and gain access to the shared radio frequency spectrum band during one of the multiple TTIs. Upon gain access to the shared radio frequency spectrum band, base station 105-*a* may transmit the broadcast paging message to UE 115-*a* via first beam 205-*a*. UE 115-*a* may blindly wake up during the first POW and determine if it has received a broadcast paging message that triggers the UE 115-*a* to wake up during the second POW. If UE 115-*a* does not receive a broadcast paging message during the first POW, UE 115-*a* may return to a power saving mode (e.g., idle mode). If UE 115-*a* does receive the broadcast paging message, it may remain in awake mode until and during the second POW.

Base station 105-*a* may perform a second LBT procedure during the second POW and gain access to the shared radio frequency spectrum band during one of multiple TTIs contained in the second POW. Upon gaining access to the shared radio frequency spectrum band, base station 105-*a* may transmit a unicast paging message to UE 115-*a*. The unicast paging message may include complete paging information, such as paging parameters or other information that is not present in the broadcast paging message, such as an indication of downlink resources for additional unicast transmissions to UE 115-*a*, a request for uplink transmissions (e.g., a keep-alive message) or an indication of resources for an uplink transmission (e.g., resources for scheduling request, a small uplink data transmission, etc.). UE 115-*a* may receive the unicast paging message during one of multiple TTIs included in the POW. In some cases, base station 105-*a* may transmit the unicast paging message on multiple beams.

Figure 3:
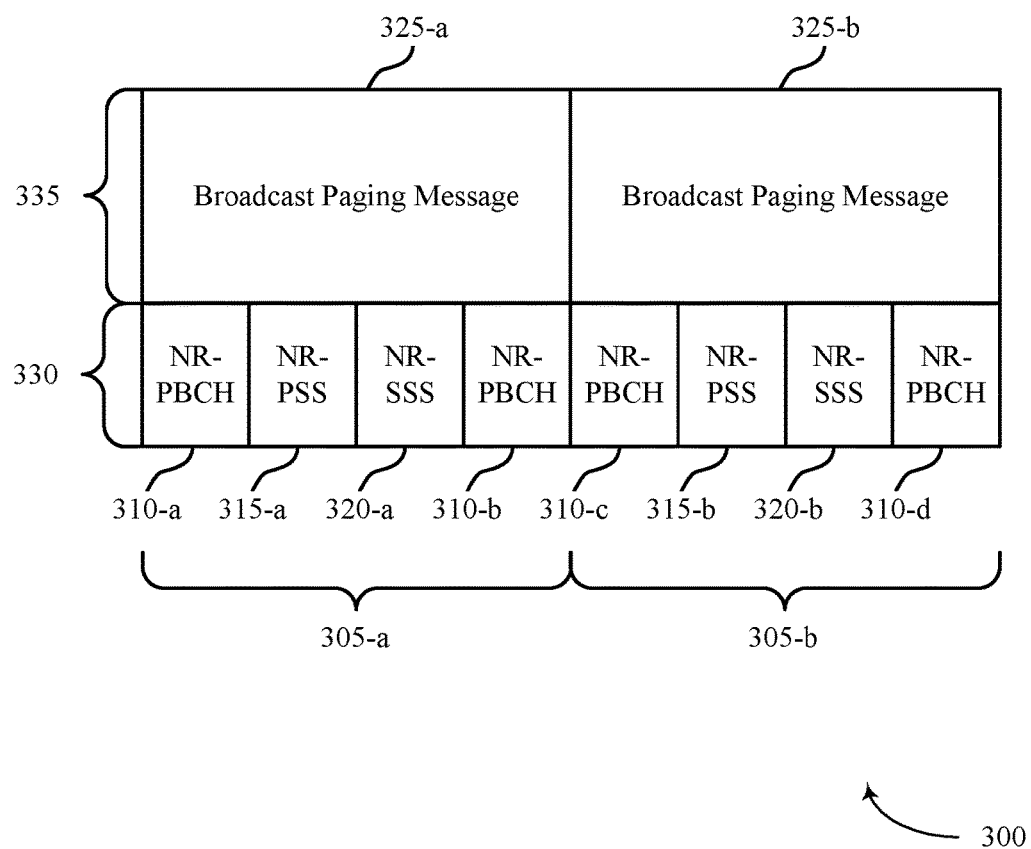
FIG. 3 illustrates an example of a wireless communications system that supports paging for mmW shared radio frequency spectrum bands in accordance with aspects of the present disclosure.

FIG. 3 illustrates an example of a paging signal 300 that supports paging for mmW shared radio frequency spectrum band in accordance with various aspects of the present disclosure. Paging signal 300 may be transmitted from a base station 105 to a UE 115, which may be examples of the corresponding devices described with reference to FIGS. 1 and 2.

A base station may transmit a paging signal on various beams. For example, the base station 105 may first broadcast signal 305-*a* on a first beam, and second broadcast signal 305-*b* on a second beam.

First broadcast signal 305-*a* may contain a DRS and a broadcast paging message 325-*a*. The DRS may include first New Radio physical broadcast channel (NR-PBCH) 310-*a*, NR primary synchronization signal (PSS) 315-*a*, NR secondary synchronization signal (SSS) 320-*a*, and second NR-PBCH 310-*b*. Broadcast paging message 325-*a* may be mapped to the DRS and concurrently transmitted. In some examples, broadcast paging message 325-*a* may be frequency domain multiplexed with the DRS. The DRS may occupy one set of frequency resources 330, and broadcast paging message 325-*a* may occupy a different set of frequency resources 335. Broadcast signal 305-*b* may contain broadcast paging message 325-*b*, which is mapped to a second DRS. The second DRS may include third NR-PBCH 310-*c*, NR-PSS 315-*b*, NR-SSS 320-*b*, and fourth NR-PBCH 310-*d*. Broadcast paging message 325-*a* may include partial paging information. The partial paging information may utilize fewer resources in time and frequency than complete paging information. For example, the partial paging information may include one or more bits indicating that the base station 105 has information to transmit to the UE 115. The partial paging information may also include an indication that base station 105-*a* may transmit a unicast paging message including complete paging information at some later time. Base station 105-*b* may perform beam sweeping to transmit a plurality of copies of paging signals, such as broadcast signal 305-*a* and broadcast signal 305-*b*, on different beams.

Figure 4:
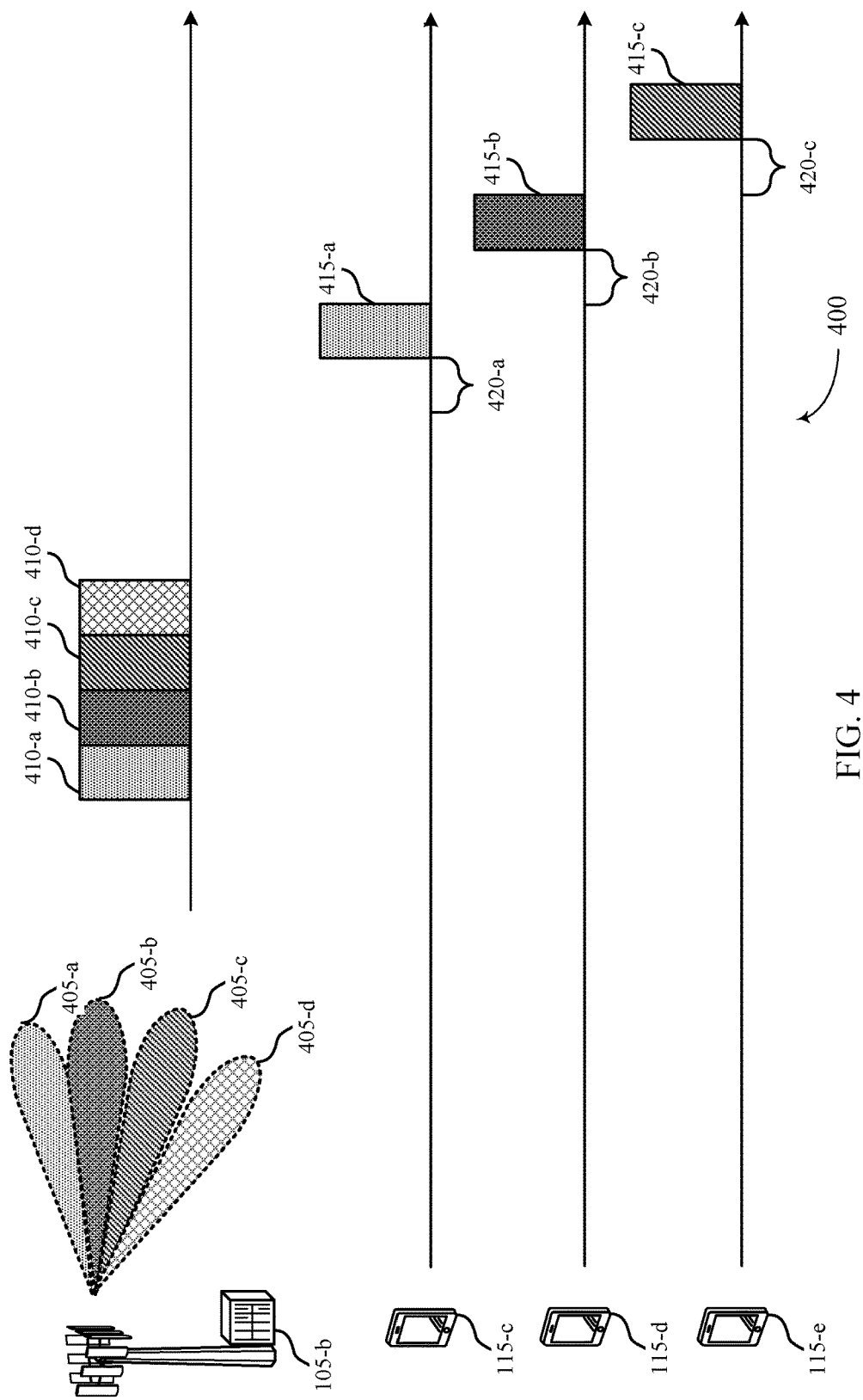
FIG. 4 illustrates an example of a wireless communications system that supports paging for mmW shared radio frequency spectrum bands in accordance with aspects of the present disclosure.

FIG. 4 illustrates an example of a wireless communication system 400 that supports paging for mmW shared radio frequency spectrum band in accordance with various aspects of the present disclosure. Wireless communication system 400 may include contention gaps prior to the transmission of random access request messages. Wireless communication system 400 may also include a base station 105-*b* and UEs 115-*c*, 115-*d*, and 115-*e*, which may be examples of the corresponding devices described with reference to FIGS. 1, 2, and 3.

In this example, base station 105-*b* may engage in a beam sweeping operation, consecutively sweeping through beams 405-*a*, 405-*b*, 405-*c*, and 405-*d*. Each beam may carry one of a plurality of copies of the broadcast paging message 410. For example, broadcast paging message 410-*a*, broadcast paging message 410-*b*, broadcast paging message 410-*c*, and broadcast paging message 410-*d* may each be identical in content. First beam 405-*a* may carry broadcast paging message 410-*a*, second beam 405-*b* may carry broadcast paging message 410-*b*, third beam 405-*c* may carry broadcast paging message 410-*c*, and fourth beam 405-*d* may carry broadcast paging message 410-*d*. A broadcast paging message, such as broadcast paging message 410-*a*, may include partial paging information. The partial paging information may utilize fewer resources in time and frequency than complete paging information. For example, the partial paging information may include one or more bits indicating that the BS has information to transmit to UE 115-*c*.

In some cases, base station 105-*b* may map the broadcast paging message to a DRS, such that the DRS is transmitted concurrent with broadcast paging message 410-*a*. The DRS may include information regarding the location of a contention gap for UE 115-*c*.

In response to receiving broadcast paging message 410-*a* on first beam 405-*a*, UE 115-*c* may transmit a random access request message 415-*a* to base station 105-*b* on first beam 405-*a*. However, UE 115-*c* may contend for access to the shared radio frequency spectrum band (e.g., perform a LBT procedure) prior to transmitting the random access request message 415-*a*. A contention gap 420-*a* may be introduced to facilitate this contention.

UE 115-*c* may obtain the location of contention gap 420-*a* from the DRS transmitted concurrent with the broadcast paging message. UE 115-*c* may perform a LBT procedure during contention gap 420-*a*, without being affected by any previous transmissions. Then, following contention gap 420-*a* and a successful LBT procedure, UE 115-*c* may transmit a random access request message on first beam 405-*a* without causing any interference for UE 115-*d* or UE 115-*e*.

UE 115-*d* may similarly receive a broadcast paging message 410-*b* on second beam 405-*b*. In response, UE 115-*d* may transmit a random access request message 415-*b* on second beam 405-*b*, following a contention gap 420-*b*. UE 115-*d* may perform a LBT procedure during contention gap 420-*b*. Because of the location of contention gap 420-*b*, random access request message 415-*a* transmitted by UE 115-*c* will not cause the LBT procedure performed by UE 115-*d* to fail. Similarly, because of the location of contention gap 420-*b*, neither the LBT procedure performed by UE 115-*d* during the contention gap nor the random access request message transmitted by UE 115-*d* following contention gap 420-*b*, may cause interference or a failed LBT procedure for UE 115-*e* or other UEs 115 (not shown).

Base station 105-*b* may transmit broadcast paging message 410-*c* on third beam 405-*c*, and broadcast paging message 410-*d* on fourth beam 405-*d*. UE 115-*e* may receive broadcast paging message 410-*c* on third beam 405-*c*, and may respond by transmitting a random access request message 415-*c*, following a LBT procedure performed during contention gap 420-*c*. Fourth beam 405-*d* may carry broadcast paging message 410-*d* to some fourth UE in a different geographic location (not shown). Alternatively, Fourth beam 405-*d* may not encounter any UE, and broadcast paging message 410-*d* may not be received by any UE.

Figure 5:
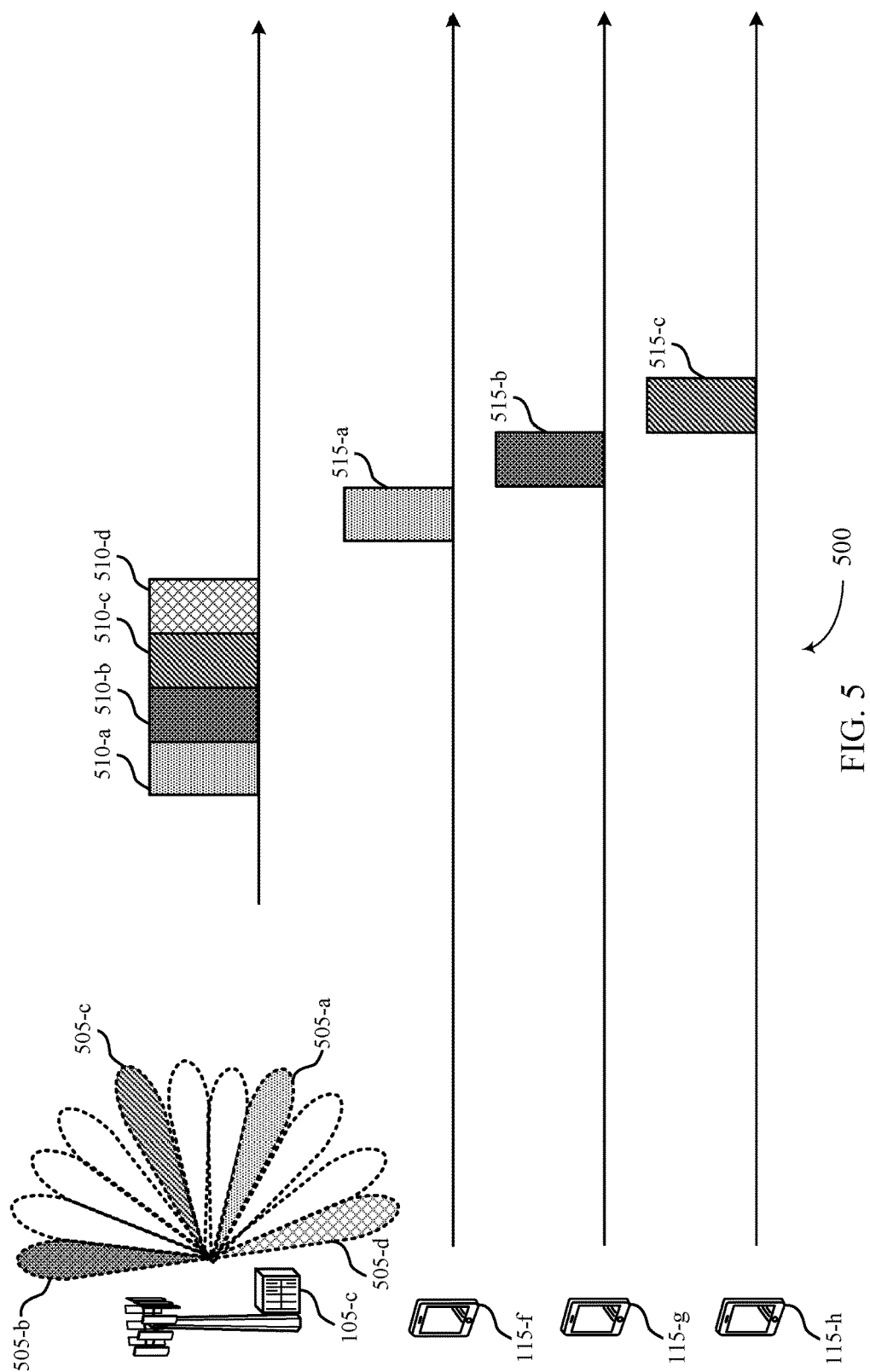
FIG. 5 illustrates an example of a wireless communications system that supports paging for mmW shared radio frequency spectrum bands in accordance with aspects of the present disclosure.

FIG. 5 illustrates an example of a wireless communication system 500 that supports paging for mmW shared radio frequency spectrum band in accordance with various aspects of the present disclosure. Wireless communication system 500 may include a beam sweeping configuration that maximizes spatial separation between beams. Wireless communication system 500 may also include a base station 105-*c* and UEs 115-*f*, 115-*g*, and 115-*h*, which may be examples of the corresponding devices described with reference to FIGS. 1-4.

Base station 105-*c* may configure a beam sweeping sequence to maximize a spatial separation between beams. For example, first beam 505-*a* may be spatially separated from second beam 505-*b*. Although second beam 505-*b* may sequentially follow first beam 505-*a* in a beam sweeping procedure, second beam 505-*a* may not be physically adjacent to first beam 505-*a*. In some examples, base station 105-*c* may engage in a beam sweeping operation, consecutively sweeping through beams 505-*a*, 505-*b*, 505-*c*, and 505-*d*. Each beam may carry one of a plurality of copies of broadcast paging message 510. For example, broadcast paging message 510-*a*, broadcast paging message 510-*b*, broadcast paging message 510-*c*, and broadcast paging message 510-*d* may each be identical in content. First beam 505-*a* may carry broadcast paging message 510-*a*, second beam 505-*b* may carry broadcast paging message 510-*b*, third beam 505-*c* may carry broadcast paging message 510-*c*, and fourth beam 505-*d* may carry broadcast paging message 510-*d*. A broadcast paging message, such as broadcast paging message 510-*a*, may include partial paging information.

In response to the received broadcast paging message, UE 115-*f* may perform a LBT procedure prior to transmitting a random access request message on first beam 505-*a*. UE 115-*g* may receive the broadcast paging message on second beam 505-5, and in response may perform a LBT procedure prior to transmitting random access request message 515-*b*. Because of the maximized spatial separation, the transmission of random access request message 515-*a* by UE 115-*f* will not cause a failure of the LBT procedure performed by UE 115-*g*. Similarly, UE 115-*h* may receive a broadcast paging message via third beam 505-*c* and respond by performing a LBT procedure and transmitting random access request message 515-*c*. Because third beam 505-*c* is spatially separated from second beam 505-*b*, the transmission of random access request message 515-*b* on second beam 505-*b* will not cause the failure of a LBT procedure performed by UE 115-*h* prior to the transmission of random access request message 515-*c* on third beam 505-*c*.

Figure 6:
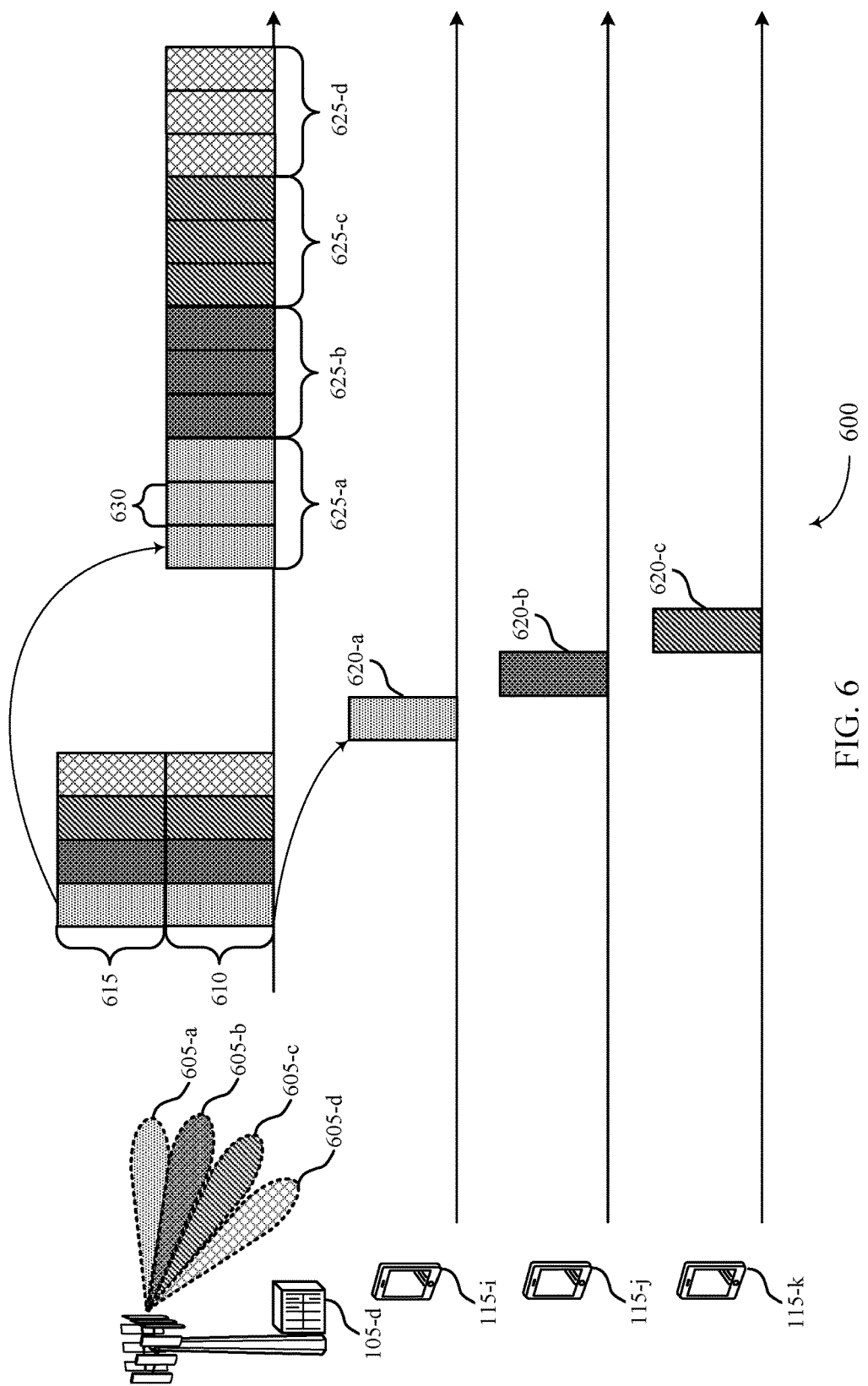
FIG. 6 illustrates an example of a wireless communications system that supports paging for mmW shared radio frequency spectrum bands in accordance with aspects of the present disclosure.

FIG. 6 illustrates an example of a wireless communications system 600 that supports paging for mmW shared radio frequency spectrum band in accordance with various aspects of the present disclosure. Wireless communications system 600 may also include a POW during which a unicast paging message can be transmitted and received. Wireless communications system 600 may include a base station 105-*d* and UEs 115-*i*, 115-*j*, and 115-*k*, which may be examples of the corresponding devices described with reference to FIGS. 1-5.

In some examples, base station 105-*d* may transmit a broadcast paging message 615. The broadcast paging message may be transmitted concurrent with a DRS 610. Broadcast paging message 615 may include partial paging information for a UE 115, such as UE 115-*i*. The broadcast paging message may be transmitted on multiple beams, such as first beam 605-*a*, second beam 605-*b*, third beam 605-*c*, and fourth beam 605-*d*.

UE 115-*i* may receive the transmitted broadcast paging message on first beam 605-*a*. In response, UE 115-*i* may transmit a random access request message 620-*a* on first beam 605-*a*. In some examples, UE 115-*i* may receive an indication from base station 105-*d* regarding a location of a CET RACH, and may transmit random access request message 620-*a* during a CET period. In other examples, UE 115-I may perform a LBT procedure prior to transmitting random access request message 620-*a*. Similarly, UE 115-*j* may receive the broadcast paging message on second beam 605-*b*, and UE 115-*k* may receive the broadcast paging message 615 on third beam 605-*c*. Each of UEs 115-*j* and 115-*k* may respond by transmitting random access request messages 620-*b* and 620-*c*.

Base station 105-*d* may receive a random access request message 620-*a* from UE 115-*i* over beam 605-*a*, and in response may transmit a beam-specific unicast paging message to UE 115-*i* via first beam 605-*a*. The unicast paging message may include complete paging information for UE 115-*i*. Similarly, the unicast paging message may be transmitted to UE 115-*j* via second beam 605-*b*, and to UE 115-*k* via third beam 605-*c*. Fourth beam 605-*d* may carry beam specific unicast information to a fourth UE (not shown), or alternatively may encounter no UE 115 and not be received. The complete paging information may include, for example, paging parameters or other information that is not present in the broadcast paging message, such as an indication of downlink resources for additional unicast transmissions to UE 115-*i*, a request for uplink transmissions (e.g., a keep-alive message) or an indication of resources for an uplink transmission (e.g., resources for scheduling request, a small uplink data transmission, etc.).

Base station 105-*d* may transmit the unicast paging message during a POW 625-*a* for UE 115-*i*. In some examples, POW 625-*a* may contain multiple TTIs 630. For example, POW 625-*a* may include three TTIs 630. POWs 625-*a*, 625-*b*, 625-*c*, and 625-*d* may be determined based on the broadcast paging message 615. For example, broadcast paging message 615 may include an indication of POW 625-*a* on first beam 605-*a*, an indication of POW 625-*b* on second beam 605-*b*, etc. Base station 105-*d* may perform a LBT procedure during a first TTI 630 of POW 625-*a*. In some examples, the LBT procedure may succeed, and base station 105-*d* may transmit the unicast paging message during the first TTI 630 of POW 625-*a*. In such examples, UE 115-*i* may receive the unicast paging message during the first TTI 630 of POW 625-*a*, and may then enter a power saving mode (e.g., idle mode) during the duration of POW 625-*a*. Alternatively, base station 105-*d* may perform a LBT procedure during the first TTI 630 of POW 625-*a*, and the LBT procedure may fail. In such examples, base station 105-*d* may perform a second LBT procedure during the second TTI 630 of POW 625-*a*. If the second LBT procedure is successful, then base station 105-*d* may transmit the unicast paging message to UE 115-*i*. If the second LBT procedure fails, then base station 105-*d* may continue to perform LBT procedures during successive TTIs 630 of POW 625-*a* until it obtains access to the shared radio frequency spectrum band, or POW 625-*a* terminates. Because POW 625-*a* contains multiple TTIs, 630, base station 105-*d* may gain access to the shared radio frequency spectrum band and transmit the unicast paging message to UE 115-*i*, even if a first LBT procedure or a second LBT procedure fails.

Similarly, base station 105-*d* may perform a LBT procedure and transmit a beam specific unicast paging transmission to UE 115-*j* over second beam 605-*b* during POW 625-*b* and to UE 115-*k* over third beam 605-*c* during POW 625-*c*. Base station 105-*d* may perform a LBT procedure during one or more TTIs 630 during a corresponding POW (e.g., POW 625-*b* for second beam 605-*b* or POW 625-*c* for third beam 605-*c*) to gain access to the shared radio frequency spectrum band and transmit the unicast paging message.

Figure 7:
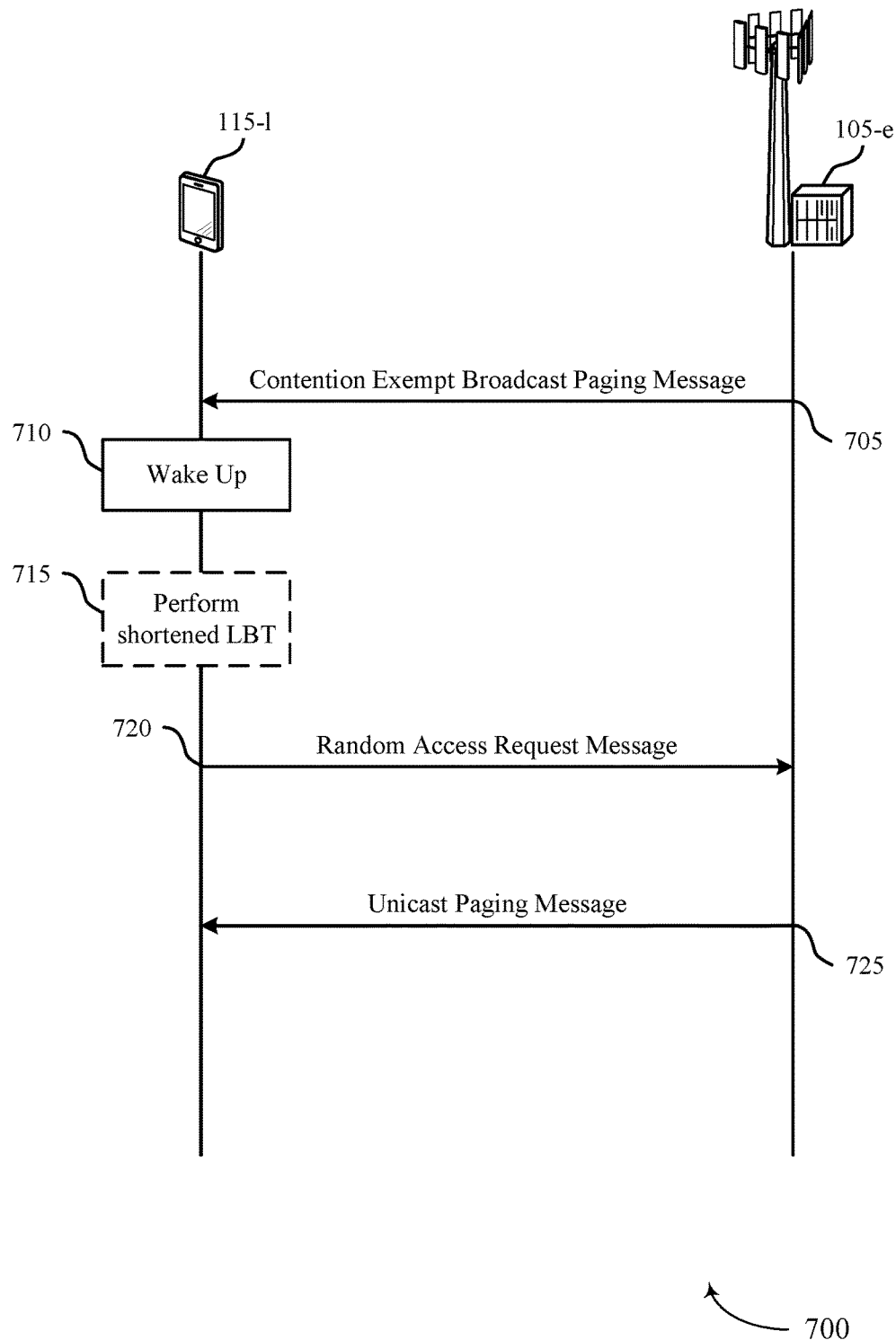
FIG. 7 illustrates an example of a process flow that supports paging for mmW shared radio frequency spectrum bands in accordance with aspects of the present disclosure.

FIG. 7 illustrates an example of a process flow 700 that supports paging for mmW shared radio frequency spectrum band in accordance with various aspects of the present disclosure. Process flow 700 may include a base station 105-*e* and UE 115-1, which may be examples of the corresponding devices described with reference to FIGS. 1-6.

At 705, base station 105-*e* transmits a broadcast paging message to UE 115-1. The broadcast paging message may include partial paging information for UE 115-1, and may be transmitted over a shared radio frequency spectrum band. Base station 105-*e* may transmit a contention exempt broadcast paging message. In some examples, base station 105-*e* may transmit the broadcast paging message during a CET period. The partial paging information may include an indication that the unicast paging message is to be transmitted to UE 115-1. Base station 105-*e* may transmit the broadcast paging message concurrent to a transmission of a DRS. For example, the broadcast paging message may be frequency domain multiplexed with the DRS. The DRS may include an indication of a CET random access channel (RACH) location for UE 115-1. Base station 105-*e* may also stagger the broadcast paging messages for different UEs across different CET periods. Base station 105-*e* may perform beam sweeping to transmit a plurality of copies of the broadcast paging message on different beams.

At 710, in response to the received broadcast paging message, UE 115-1 wakes up. In a first example, at 715, UE 115-1 may perform a shortened LBT procedure to gain access to the shared radio frequency spectrum band. In such examples, UE 115-1 may perform a shortened LBT procedure during a contention gap preceding the transmission of the random access request message.

At 720, UE 115-1 transmits a random access request message to base station 105-*e*. In a first example, UE 115-1 may transmit the random access request message after performing a LBT procedure. In a second example, UE 115-1 may transmit a contention exempt random access request, instead of performing a LBT procedure at 715. In such examples, UE 115-1 may obtain an indication of a CET random access channel (RACH) location from the received DRS.

UE 115-1 may determine the timing of a random access request message deterministically. In such examples, UE 115-1 may transmit the random access request at some fixed time offset following reception of the broadcast paging message. Alternatively, UE 115-1 may obtain from the broadcast paging message an indication of the timing of the random access request message.

At 725, base station 105-*e* transmits a unicast paging message to UE 115-1. The unicast paging message may include complete paging information for UE 115-1. The complete paging information may include an indication of downlink resources associated with a future transmission from base station 105-*e* to UE 115-1, and may be beam-specific. Base station 105-*e* may transmit the unicast paging message after performing a LBT procedure to gain access to the shared radio frequency spectrum band during a POW associated with UE 115-1 for the unicast paging message. The POW may include multiple TTIs. UE 115-1 may determine the POW associated with the unicast paging message and power on a receiver of UE 115-1 during the POW, or remain in a power on state during the POW, to receive the unicast paging message.

Figure 8:
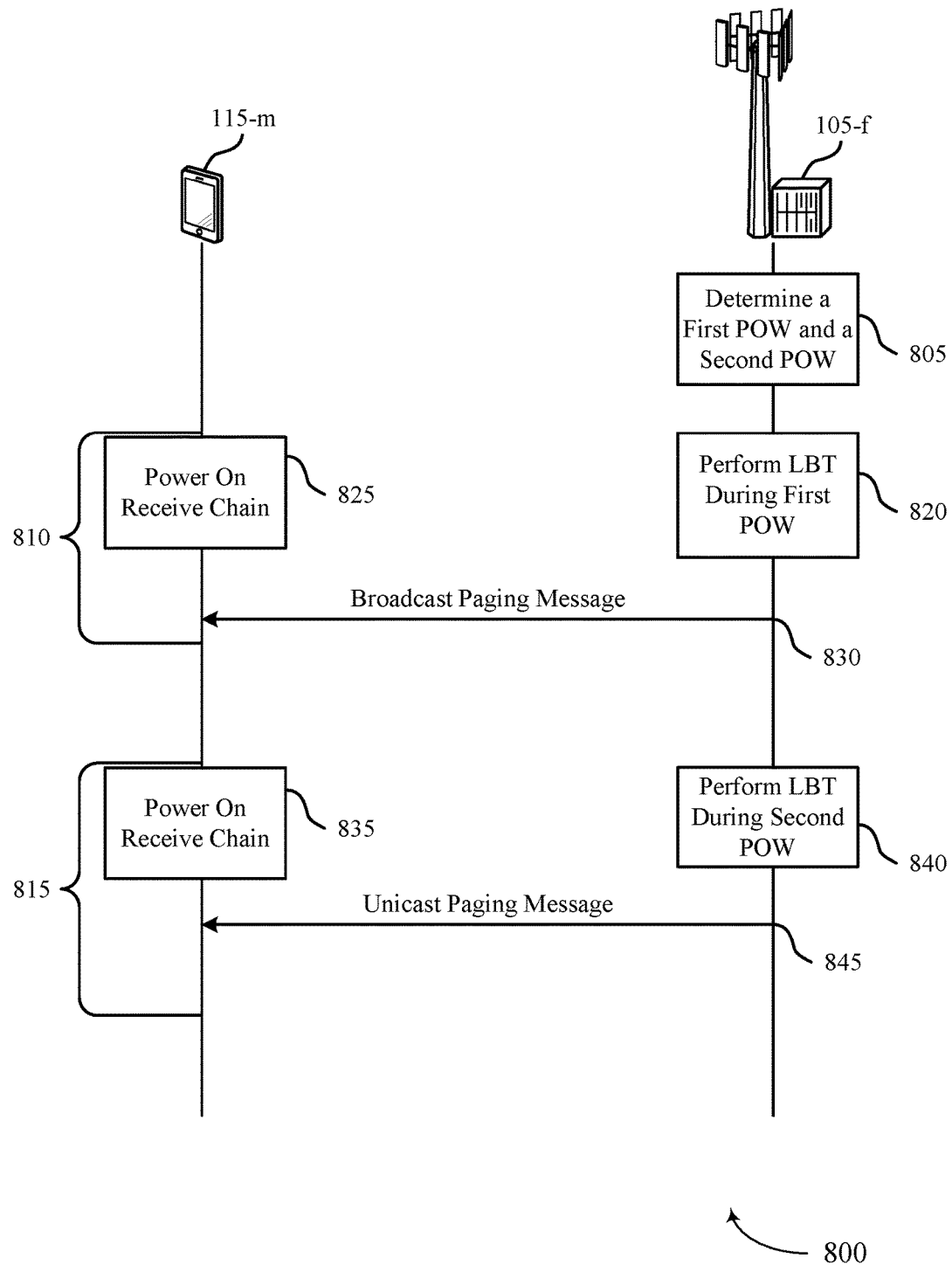
FIG. 8 illustrates an example of a process flow that supports paging for mmW shared radio frequency spectrum bands in accordance with aspects of the present disclosure.

FIG. 8 illustrates an example of a process flow 800 that supports paging for mmW shared radio frequency spectrum band in accordance with various aspects of the present disclosure. Process flow 800 may include a base station 105-*f* and UE 115-*m*, which may be examples of the corresponding devices described with reference to FIGS. 1-7.

At 805, base station 105-*f* determines a first POW 810 and a second POW 815. First POW 810 and second POW 815 may include multiple TTIs. At 820, base station 105-*f* performs a LBT procedure during first POW 810, to gain access to the shared radio frequency spectrum band. At 825, UE 115-*m* powers on a receive chain during first POW 810 to receive a broadcast paging message during the first POW.

At 830, base station 105-*f* transmits a broadcast paging message during first POW 810. The broadcast paging message includes partial paging information for UE 115-*m*. The partial paging information may include an indication that the unicast paging message is to be transmitted to UE 115-*m*. Base station 105-*f* may stagger broadcast paging message for different UEs across different POWs.

At 835, UE 115-*m* powers on a receive chain during second POW 815 to receive a unicast paging message during the second POW. At 840, base station 105-*f* performs a second LBT procedure during second POW 815 to gain access to the shared radio frequency spectrum band.

At 845, base station 105-*f* transmits a unicast paging message during second POW 815. The unicast paging message includes complete paging information for UE 115-*m*. The complete paging information may include an indication of downlink resources associated with a future transmission from base station 105-*f* to UE 115-*m*. Base station 105-*f* may transmit the unicast paging message on multiple beams.

Figure 9:
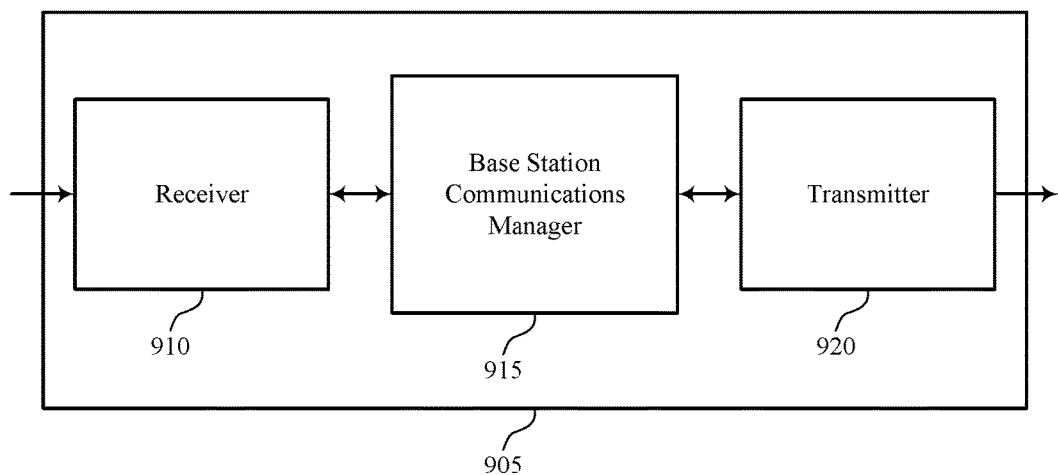
FIGS. 9 through 11 show block diagrams of a device that supports paging for mmW shared radio frequency spectrum bands in accordance with aspects of the present disclosure.

FIG. 9 shows a block diagram 900 of a wireless device 905 that supports paging for mmW shared radio frequency spectrum band in accordance with various aspects of the present disclosure. Wireless device 905 may be an example of aspects of a base station 105 as described with reference to FIG. 1. Wireless device 905 may include receiver 910, base station communications manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to paging for mmW shared radio frequency spectrum band, etc.). Information may be passed on to other components of the device. The receiver 910 may be an example of aspects of the transceiver 1235 described with reference to FIG. 12.

Base station communications manager 915 may be an example of aspects of the base station communications manager 1215 described with reference to FIG. 12.

Base station communications manager 915 and/or at least some of its various sub-components may be implemented in hardware, software executed by a processor, firmware, or any combination thereof. If implemented in software executed by a processor, the functions of the base station communications manager 915 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The base station communications manager 915 and/or at least some of its various sub-components may be physically located at various positions, including being distributed such that portions of functions are implemented at different physical locations by one or more physical devices. In some examples, base station communications manager 915 and/or at least some of its various sub-components may be a separate and distinct component in accordance with various aspects of the present disclosure. In other examples, base station communications manager 915 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 915 may transmit a contention exempt broadcast paging message including partial paging information for a user equipment (UE) over a shared radio frequency spectrum band concurrent with a transmission of a broadcast discovery reference signal (DRS), receive, in response to the broadcast paging message, a random access request message, and transmit, based on the received random access request message, a unicast paging message including complete paging information for the UE. The base station communications manager 915 may also determine a first POW and a second POW for a UE, each of the first POW and the second POW including multiple transmission time intervals (TTIs), perform a first listen-before-talk (LBT) procedure to gain access to a shared radio frequency spectrum band during the first POW, transmit a broadcast paging message over the shared radio frequency spectrum band during the first POW based on the first LBT procedure, the broadcast paging message including partial paging information for the UE, perform a second LBT procedure to gain access to the shared radio frequency spectrum band during the second POW, and transmit a unicast paging message to the UE over the shared radio frequency spectrum band during the second POW based on the second LBT procedure, the unicast paging message including complete paging information for the UE.

Transmitter 920 may transmit signals generated by other components of the device. In some examples, the transmitter 920 may be collocated with a receiver 910 in a transceiver module. For example, the transmitter 920 may be an example of aspects of the transceiver 1235 described with reference to FIG. 12. The transmitter 920 may include a single antenna, or it may include a set of antennas.

Figure 10:
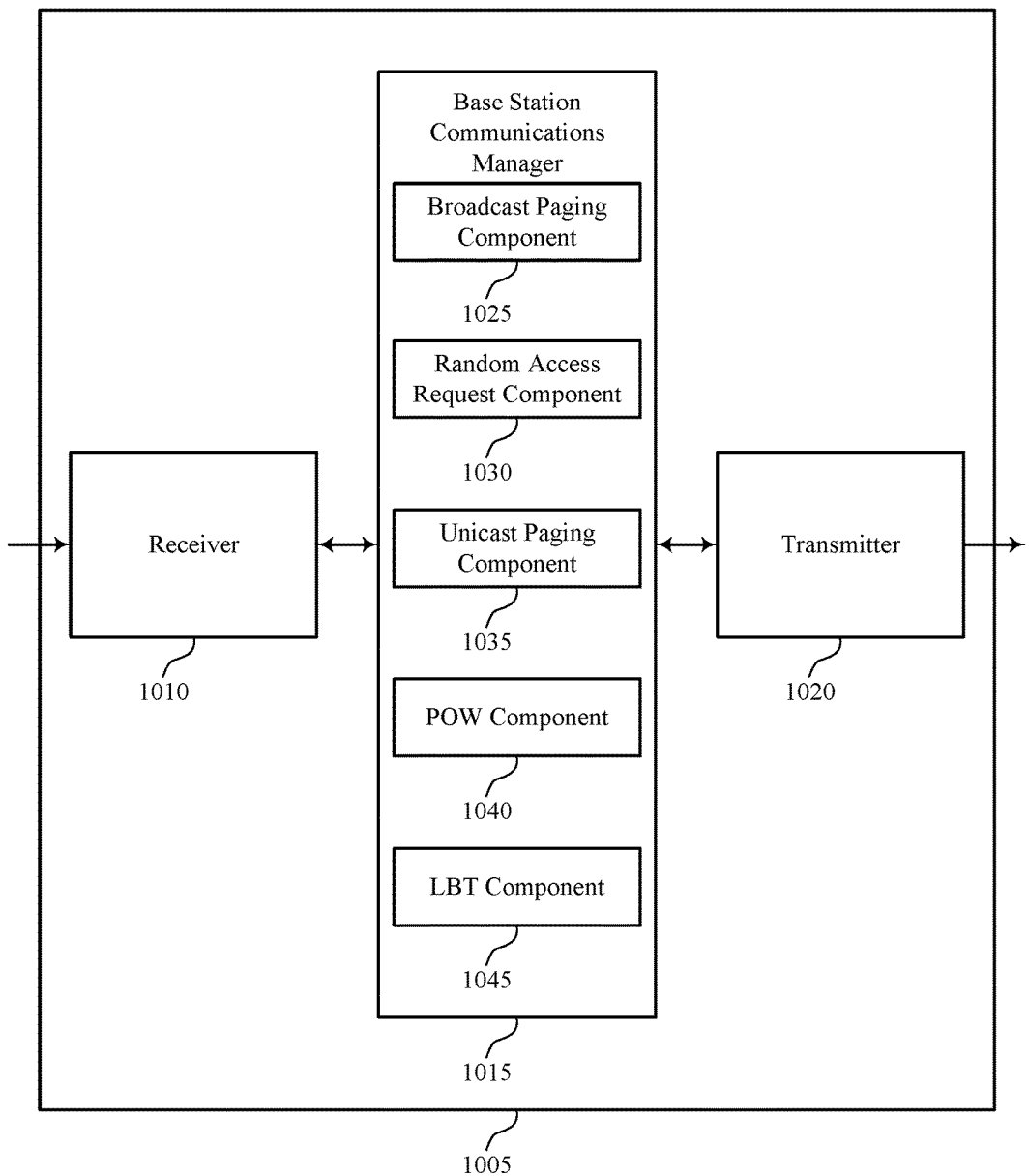

FIG. 10 shows a block diagram 1000 of a wireless device 1005 that supports paging for mmW shared radio frequency spectrum band in accordance with various aspects of the present disclosure. Wireless device 1005 may be an example of aspects of a wireless device 905 or a base station 105 as described with reference to FIGS. 1 and 9. Wireless device 1005 may include receiver 1010, base station communications manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to paging for mmW shared radio frequency spectrum band, etc.). Information may be passed on to other components of the device. The receiver 1010 may be an example of aspects of the transceiver 1235 described with reference to FIG. 12.

Base station communications manager 1015 may be an example of aspects of the base station communications manager 1215 described with reference to FIG. 12.

Base station communications manager 1015 may also include broadcast paging component 1025, random access request component 1030, unicast paging component 1035, POW component 1040, and LBT component 1045.

Broadcast paging component 1025 may transmit a contention exempt broadcast paging message including partial paging information for a UE over a shared radio frequency spectrum band concurrent with a transmission of a broadcast discovery reference signal (DRS) and transmit a broadcast paging message over the shared radio frequency spectrum band during the first POW based on the first LBT procedure, the broadcast paging message including partial paging information for the UE. In some cases, transmitting the broadcast paging message includes: frequency domain multiplexing the broadcast paging message with the DRS. In some cases, transmitting the broadcast paging message further includes: including in the broadcast DRS an indication of a CET random access channel (RACH) location for the UE. In some cases, the partial paging information includes an indication that the unicast paging message is to be transmitted to the UE. In some cases, the partial paging information includes an indication that the unicast paging message is to be transmitted to the UE.

Random access request component 1030 may receive, in response to the broadcast paging message, a random access request message.

Unicast paging component 1035 may transmit, based on the received random access request message, a unicast paging message including complete paging information for the UE and transmit a unicast paging message to the UE over the shared radio frequency spectrum band during the second POW based on the second LBT procedure, the unicast paging message including complete paging information for the UE. In some cases, the complete paging information includes an indication of downlink resources associated with a future transmission from the base station to the UE. In some cases, the unicast paging message is transmitted on multiple beams. In some cases, the complete paging information includes an indication of downlink resources associated with a future transmission from the base station to the UE.

POW component 1040 may transmit the unicast paging message further includes performing a listen before talk (LBT) to gain access to the shared radio frequency spectrum band during a POW associated with the UE for the unicast paging message and determine a first POW and a second POW for a UE, each of the first POW and the second POW including multiple TTIs. In some cases, the POW includes multiple TTIs. In some cases, the second POW includes multiple TTIs.

LBT component 1045 may perform a first LBT procedure to gain access to a shared radio frequency spectrum band during the first POW and perform a second LBT procedure to gain access to the shared radio frequency spectrum band during the second POW.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1235 described with reference to FIG. 12. The transmitter 1020 may include a single antenna, or it may include a set of antennas.

Figure 11:
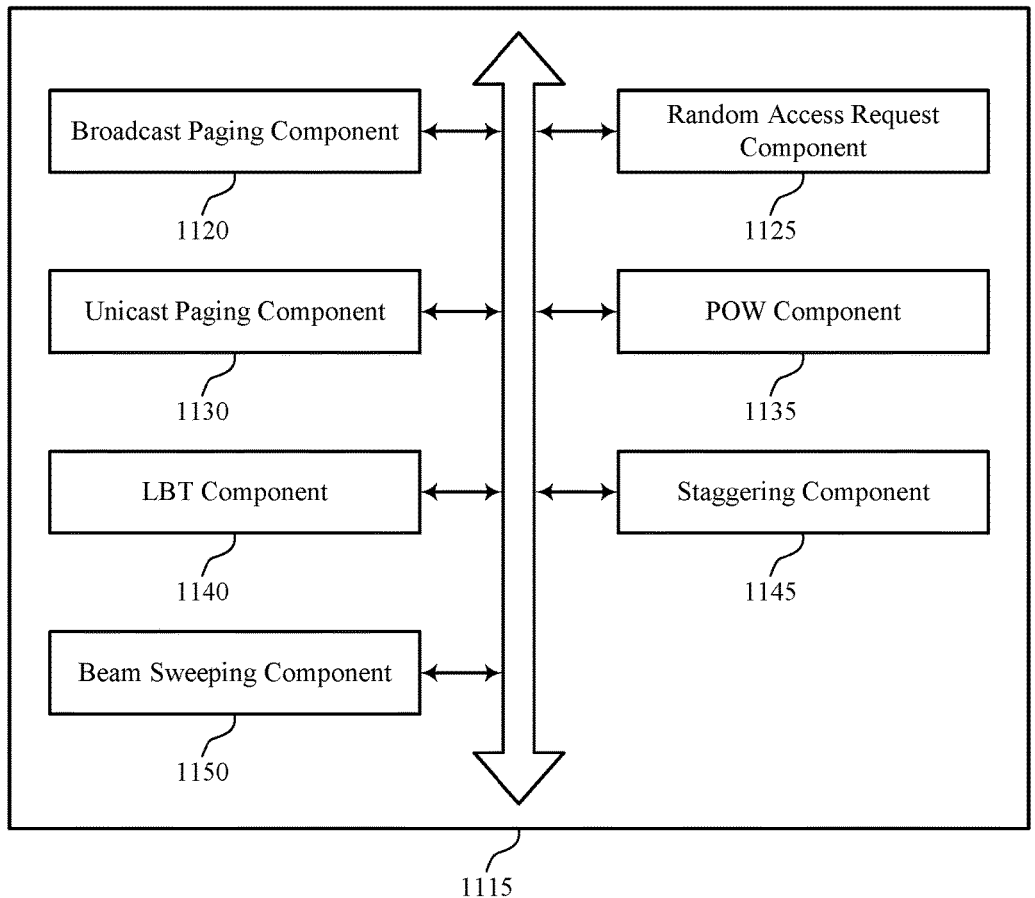

FIG. 11 shows a block diagram 1100 of a base station communications manager 1115 that supports paging for mmW shared radio frequency spectrum band in accordance with various aspects of the present disclosure. The base station communications manager 1115 may be an example of aspects of a base station communications manager 915, a base station communications manager 1015, or a base station communications manager 1215 described with reference to FIGS. 9, 10, and 12. The base station communications manager 1115 may include broadcast paging component 1120, random access request component 1125, unicast paging component 1130, POW component 1135, LBT component 1140, staggering component 1145, and beam sweeping component 1150. Each of these modules may communicate, directly or indirectly, with one another (e.g., via one or more buses).

Broadcast paging component 1120 may transmit a contention exempt broadcast paging message including partial paging information for a UE over a shared radio frequency spectrum band concurrent with a transmission of a broadcast discovery reference signal (DRS) and transmit a broadcast paging message over the shared radio frequency spectrum band during the first POW based on the first LBT procedure, the broadcast paging message including partial paging information for the UE. In some cases, transmitting the broadcast paging message includes: frequency domain multiplexing the broadcast paging message with the DRS. In some cases, transmitting the broadcast paging message further includes: including in the broadcast DRS an indication of a CET RACH location for the UE. In some cases, the partial paging information includes an indication that the unicast paging message is to be transmitted to the UE. In some cases, the partial paging information includes an indication that the unicast paging message is to be transmitted to the UE.

Random access request component 1125 may receive, in response to the broadcast paging message, a random access request message.

Unicast paging component 1130 may transmit, based on the received random access request message, a unicast paging message including complete paging information for the UE and transmit a unicast paging message to the UE over the shared radio frequency spectrum band during the second POW based on the second LBT procedure, the unicast paging message including complete paging information for the UE. In some cases, the complete paging information includes an indication of downlink resources associated with a future transmission from the base station to the UE. In some cases, the unicast paging message is transmitted on multiple beams. In some cases, the complete paging information includes an indication of downlink resources associated with a future transmission from the base station to the UE.

POW component 1135 may transmit the unicast paging message further includes performing a listen before talk (LBT) to gain access to the shared radio frequency spectrum band during a POW associated with the UE for the unicast paging message and determine a first POW and a second POW for a UE, each of the first POW and the second POW including multiple TTIs. In some cases, the POW includes multiple TTIs. In some cases, the second POW includes multiple TTIs.

LBT component 1140 may perform a first LBT procedure to gain access to a shared radio frequency spectrum band during the first POW and perform a second LBT procedure to gain access to the shared radio frequency spectrum band during the second POW.

Staggering component 1145 may stagger broadcast paging messages for different UEs across different CET periods. In some cases, transmitting the broadcast paging message further includes: staggering broadcast paging messages for different UEs across different POWs.

Beam sweeping component 1150 may perform beam sweeping to transmit a set of copies of the broadcast paging message on different beams.

Figure 12:
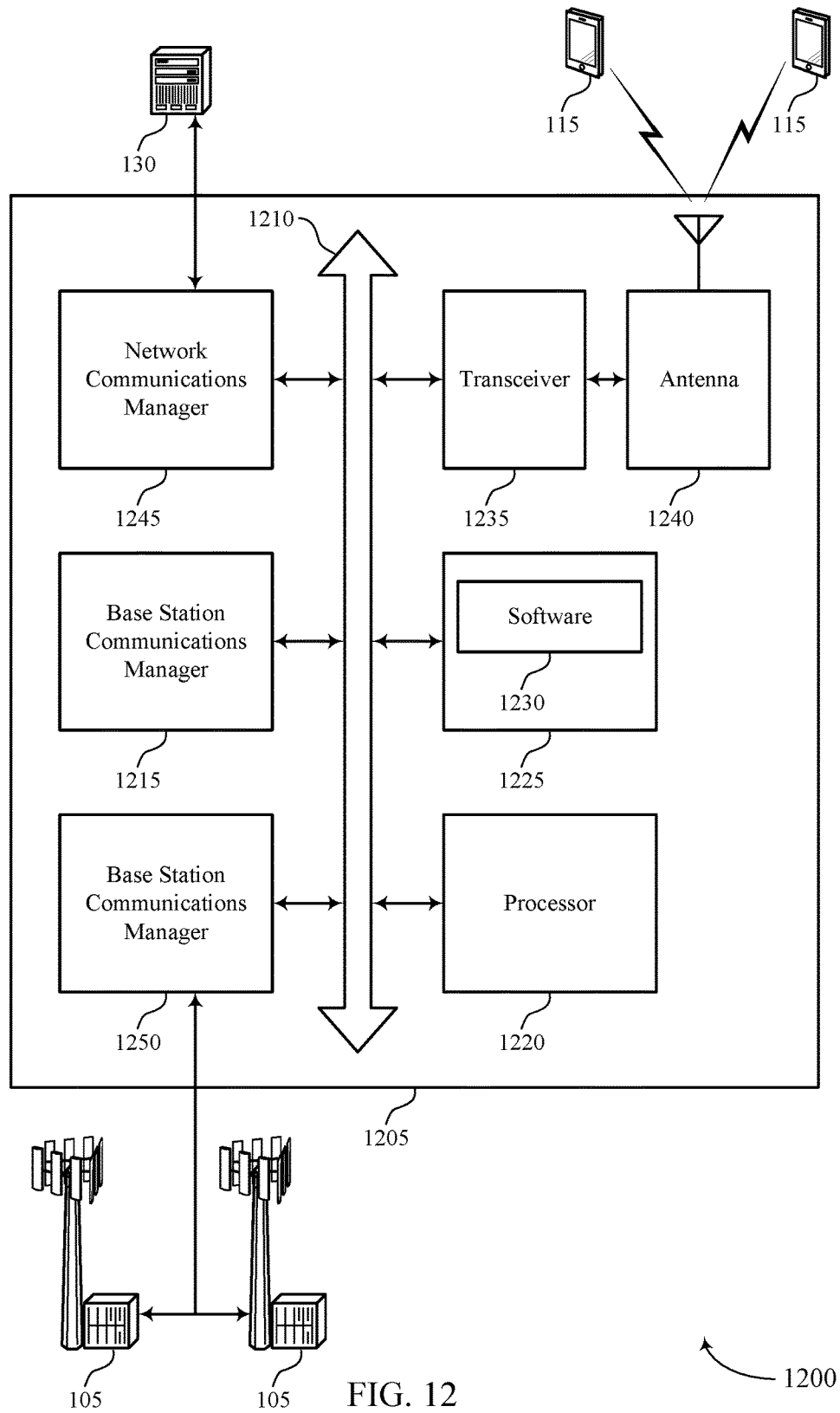
FIG. 12 illustrates a block diagram of a system including a base station that supports paging for mmW shared radio frequency spectrum bands in accordance with aspects of the present disclosure.

FIG. 12 shows a diagram of a system 1200 including a device 1205 that supports paging for mmW shared radio frequency spectrum band in accordance with various aspects of the present disclosure. Device 1205 may be an example of or include the components of wireless device 905, wireless device 1005, or a base station 105 as described above, e.g., with reference to FIGS. 1, 9 and 10. Device 1205 may include components for bi-directional voice and data communications including components for transmitting and receiving communications, including base station communications manager 1215, processor 1220, memory 1225, software 1230, transceiver 1235, antenna 1240, network communications manager 1245, and base station communications manager 1250. These components may be in electronic communication via one or more busses (e.g., bus 1210). Device 1205 may communicate wirelessly with one or more UEs 115.

Base station communications manager 1215 may manage communications with other base station 105, and may include a controller or scheduler for controlling communications with UEs 115 in cooperation with other base stations 105. For example, the base station communications manager 1215 may coordinate scheduling for transmissions to UEs 115 for various interference mitigation techniques such as beamforming or joint transmission. In some examples, base station communications manager 1215 may provide an X2 interface within an Long Term Evolution (LTE)/LTE-A wireless communication network technology to provide communication between base stations 105.

Processor 1220 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1220 may be configured to operate a memory array using a memory controller. In other cases, a memory controller may be integrated into processor 1220. Processor 1220 may be configured to execute computer-readable instructions stored in a memory to perform various functions (e.g., functions or tasks supporting paging for mmW shared radio frequency spectrum band).

Memory 1225 may include random access memory (RAM) and read only memory (ROM). The memory 1225 may store computer-readable, computer-executable software 1230 including instructions that, when executed, cause the processor to perform various functions described herein. In some cases, the memory 1225 may contain, among other things, a basic input/output system (BIOS) which may control basic hardware and/or software operation such as the interaction with peripheral components or devices.

Software 1230 may include code to implement aspects of the present disclosure, including code to support paging for mmW shared radio frequency spectrum band. Software 1230 may be stored in a non-transitory computer-readable medium such as system memory or other memory. In some cases, the software 1230 may not be directly executable by the processor but may cause a computer (e.g., when compiled and executed) to perform functions described herein.

Transceiver 1235 may communicate bi-directionally, via one or more antennas, wired, or wireless links as described above. For example, the transceiver 1235 may represent a wireless transceiver and may communicate bi-directionally with another wireless transceiver. The transceiver 1235 may also include a modem to modulate the packets and provide the modulated packets to the antennas for transmission, and to demodulate packets received from the antennas.

In some cases, the wireless device may include a single antenna 1240. However, in some cases the device may have more than one antenna 1240, which may be capable of concurrently transmitting or receiving multiple wireless transmissions.

Network communications manager 1245 may manage communications with the core network (e.g., via one or more wired backhaul links). For example, the network communications manager 1245 may manage the transfer of data communications for client devices, such as one or more UEs 115.

Base station communications manager 1250 may manage communications with other base station 105, and may include a controller or scheduler for controlling communications with UEs 115 in cooperation with other base stations 105. For example, the base station communications manager 1250 may coordinate scheduling for transmissions to UEs 115 for various interference mitigation techniques such as beamforming or joint transmission. In some examples, base station communications manager 1250 may provide an X2 interface within an LTE/LTE-A wireless communication network technology to provide communication between base stations 105.

Figure 13:
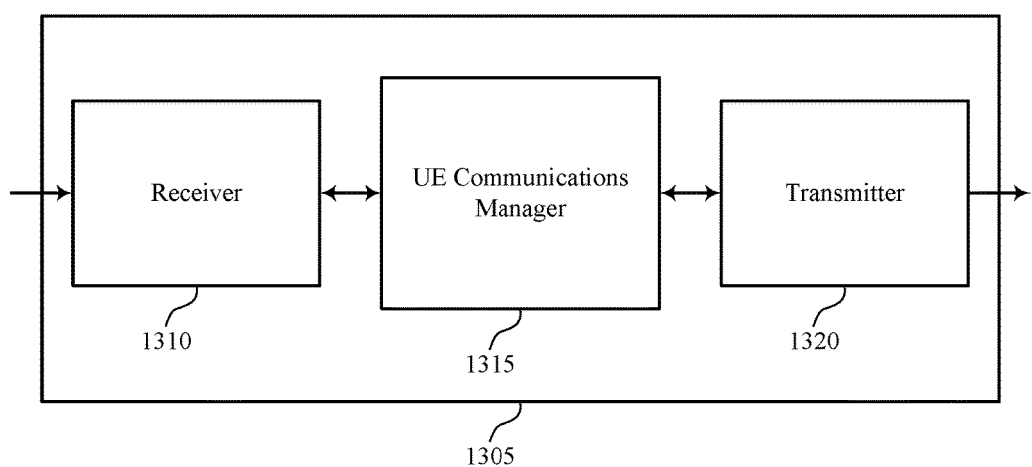
FIGS. 13 through 15 show block diagrams of a device that supports paging for mmW shared radio frequency spectrum bands in accordance with aspects of the present disclosure.

FIG. 13 shows a block diagram 1300 of a wireless device 1305 that supports paging for mmW shared radio frequency spectrum band in accordance with various aspects of the present disclosure. Wireless device 1305 may be an example of aspects of a UE 115 as described with reference to FIG. 1. Wireless device 1305 may include receiver 1310, UE communications manager 1315, and transmitter 1320. Wireless device 1305 may also include a processor. Each of these components may be in communication with one another (e.g., via one or more buses).

Receiver 1310 may receive information such as packets, user data, or control information associated with various information channels (e.g., control channels, data channels, and information related to paging for mmW shared radio frequency spectrum band, etc.). Information may be passed on to other components of the device. The receiver 1310 may be an example of aspects of the transceiver 1635 described with reference to FIG. 16.

UE communications manager 1315 may be an example of aspects of the UE communications manager 1615 described with reference to FIG. 16.

UE communications manager 1315 and/or at least some of its various sub-components may be implemented in hardware, software executed by a processor, firmware, or any combination thereof. If implemented in software executed by a processor, the functions of the UE communications manager 1315 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The UE communications manager 1315 and/or at least some of its various sub-components may be physically located at various positions, including being distributed such that portions of functions are implemented at different physical locations by one or more physical devices. In some examples, UE communications manager 1315 and/or at least some of its various sub-components may be a separate and distinct component in accordance with various aspects of the present disclosure. In other examples, UE communications manager 1315 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 1315 may receive a contention exempt broadcast paging message including partial paging information for the UE over a shared radio frequency spectrum band concurrent with a reception of a broadcast discovery reference signal (DRS), transmit, in response to the received broadcast paging message, a random access request message, and receive, based on the transmitted random access request, a unicast paging message including complete paging information for the UE. The UE communications manager 1315 may also determine a first POW including multiple TTIs, power on a receive chain during the first POW to receive a broadcast paging message during the first POW, the broadcast paging message including partial paging information for the UE, and power on a receive chain, based on the received broadcast paging message, during a second POW to receive a unicast paging message, the unicast paging message including complete paging information for the UE.

Transmitter 1320 may transmit signals generated by other components of the device. In some examples, the transmitter 1320 may be collocated with a receiver 1310 in a transceiver module. For example, the transmitter 1320 may be an example of aspects of the transceiver 1635 described with reference to FIG. 16. The transmitter 1320 may include a single antenna, or it may include a set of antennas.

Figure 14:
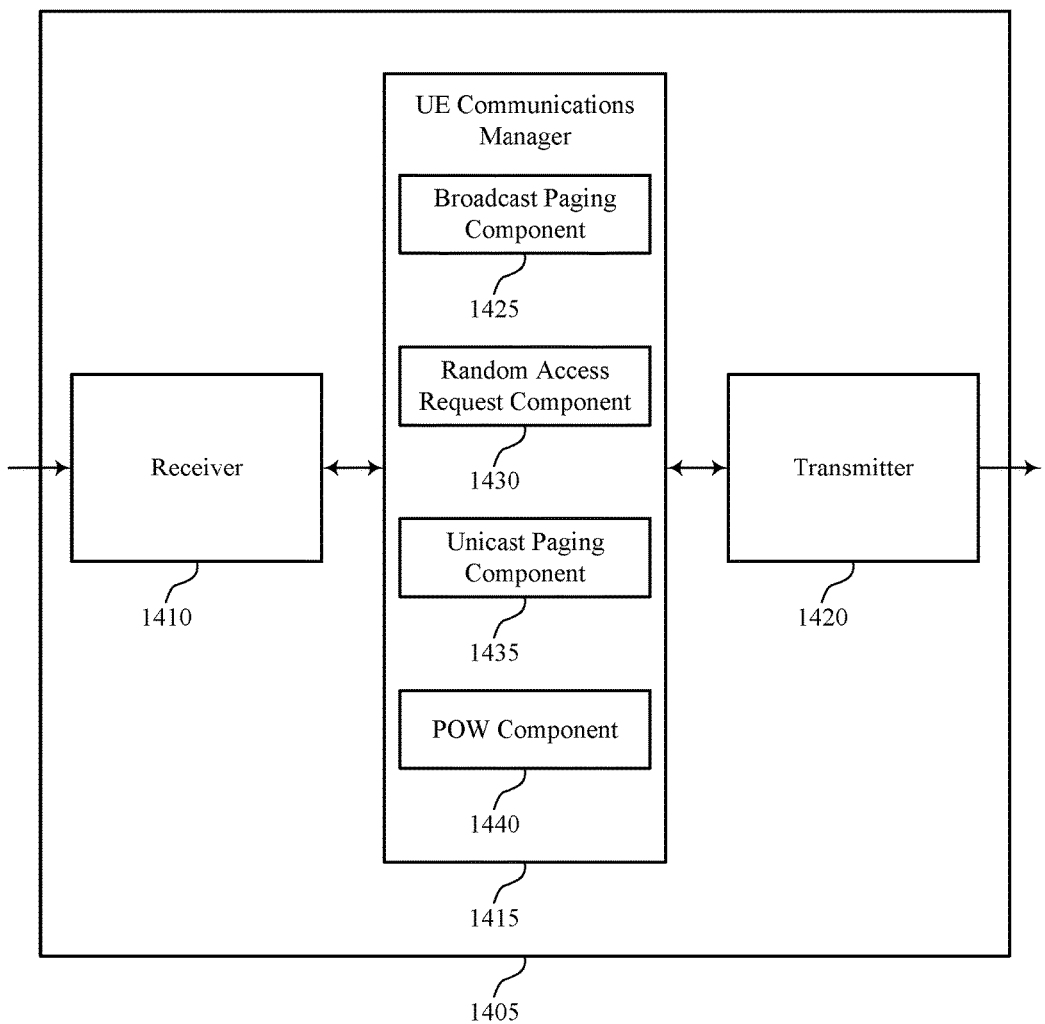

FIG. 14 shows a block diagram 1400 of a wireless device 1405 that supports paging for mmW shared radio frequency spectrum band in accordance with various aspects of the present disclosure. Wireless device 1405 may be an example of aspects of a wireless device 1305 or a UE 115 as described with reference to FIGS. 1 and 13. Wireless device 1405 may include receiver 1410, UE communications manager 1415, and transmitter 1420. Wireless device 1405 may also include a processor. Each of these components may be in communication with one another (e.g., via one or more buses).

Receiver 1410 may receive information such as packets, user data, or control information associated with various information channels (e.g., control channels, data channels, and information related to paging for mmW shared radio frequency spectrum band, etc.). Information may be passed on to other components of the device. The receiver 1410 may be an example of aspects of the transceiver 1635 described with reference to FIG. 16.

UE communications manager 1415 may be an example of aspects of the UE communications manager 1615 described with reference to FIG. 16.

UE communications manager 1415 may also include broadcast paging component 1425, random access request component 1430, unicast paging component 1435, and POW component 1440.

Broadcast paging component 1425 may receive a contention exempt broadcast paging message including partial paging information for the UE over a shared radio frequency spectrum band concurrent with a reception of a broadcast discovery reference signal (DRS) and power on a receive chain during the first POW to receive a broadcast paging message during the first POW, the broadcast paging message including partial paging information for the UE. In some cases, the broadcast paging message is frequency domain multiplexed with the DRS. In some cases, receiving the broadcast paging message further includes: obtaining from the broadcast DRS an indication of a CET RACH location for the UE. In some cases, the partial paging information includes an indication that the unicast paging message is to be transmitted to the UE. In some cases, the partial paging information includes an indication that the unicast paging message is to be transmitted to the UE.

Random access request component 1430 may transmit, in response to the received broadcast paging message, a random access request message. In some cases, random access request component 1430 may transmit a contention exempt random access request. In some cases, the random access request message includes a CET. In some cases, transmitting the random access request message further includes: performing a listen before talk (LBT) procedure to gain access to the shared radio frequency spectrum band prior to transmitting the random access request message.

Unicast paging component 1435 may receive, based on the transmitted random access request, a unicast paging message including complete paging information for the UE and power on a receive chain, based on the received broadcast paging message, during a second POW to receive a unicast paging message, the unicast paging message including complete paging information for the UE. In some cases, the complete paging information includes an indication of downlink resources associated with a future transmission from the base station to the UE. In some cases, the transmission of the unicast paging message is beam-specific. In some cases, the unicast paging message is transmitted on multiple beams.

POW component 1440 may power on a receiver of the UE during the POW and determine a first POW including multiple TTIs. In some cases, receiving the unicast paging message further includes: determining a POW associated with the unicast paging message. In some cases, the POW includes multiple TTIs. In some cases, the second POW includes multiple TTIs.

Transmitter 1420 may transmit signals generated by other components of the device. In some examples, the transmitter 1420 may be collocated with a receiver 1410 in a transceiver module. For example, the transmitter 1420 may be an example of aspects of the transceiver 1635 described with reference to FIG. 16. The transmitter 1420 may include a single antenna, or it may include a set of antennas.

Figure 15:
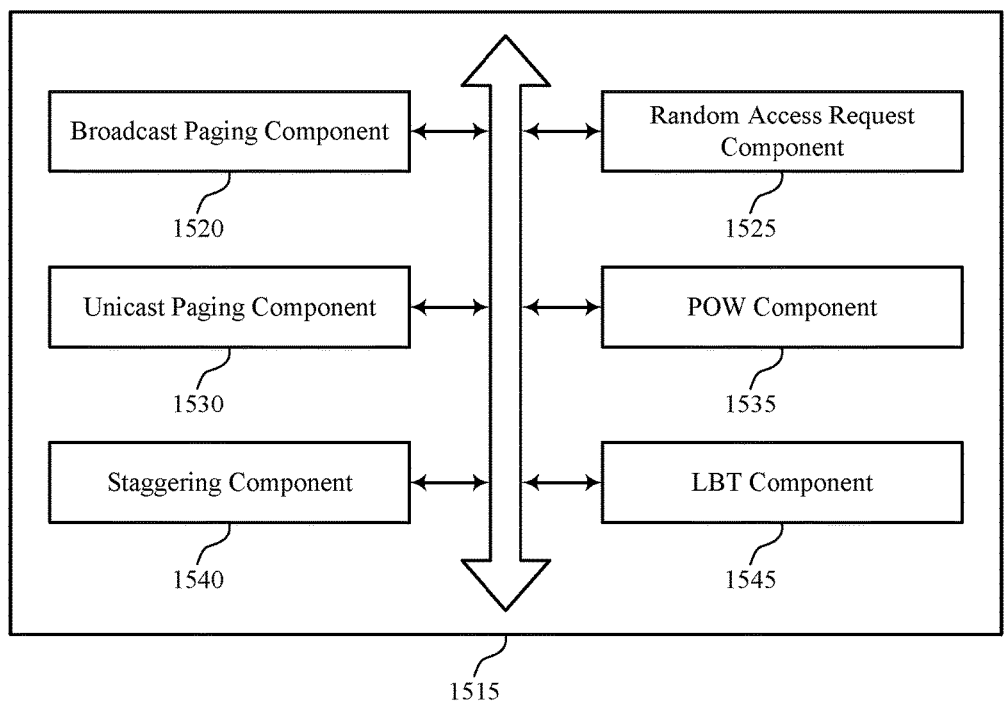

FIG. 15 shows a block diagram 1500 of a UE communications manager 1515 that supports paging for mmW shared radio frequency spectrum band in accordance with various aspects of the present disclosure. The UE communications manager 1515 may be an example of aspects of a UE communications manager 1615 described with reference to FIGS. 13, 14, and 16. The UE communications manager 1515 may include broadcast paging component 1520, random access request component 1525, unicast paging component 1530, POW component 1535, staggering component 1540, and LBT component 1545. Each of these modules may communicate, directly or indirectly, with one another (e.g., via one or more buses).

Broadcast paging component 1520 may receive a broadcast paging message including partial paging information for the UE over a shared radio frequency spectrum band during a contention exempt transmission (CET) period and concurrent with a reception of a broadcast discovery reference signal (DRS) and power on a receive chain during the first POW to receive a broadcast paging message during the first POW, the broadcast paging message including partial paging information for the UE. In some cases, the broadcast paging message is frequency domain multiplexed with the DRS. In some cases, receiving the broadcast paging message further includes: obtaining from the broadcast DRS an indication of a CET RACH location for the UE. In some cases, the partial paging information includes an indication that the unicast paging message is to be transmitted to the UE. In some cases, the partial paging information includes an indication that the unicast paging message is to be transmitted to the UE.

Random access request component 1525 may transmit, in response to the received broadcast paging message, a random access request message. In some cases, random access request component 1525 may transmit a contention exempt random access request message. In some cases, the random access request message includes a CET. In some cases, transmitting the random access request message further includes: performing a listen before talk (LBT) procedure to gain access to the shared radio frequency spectrum band prior to transmitting the random access request message.

Unicast paging component 1530 may receive, based on the transmitted random access request, a unicast paging message including complete paging information for the UE and power on a receive chain, based on the received broadcast paging message, during a second POW to receive a unicast paging message, the unicast paging message including complete paging information for the UE. In some cases, the complete paging information includes an indication of downlink resources associated with a future transmission from the base station to the UE. In some cases, the transmission of the unicast paging message is beam-specific. In some cases, the unicast paging message is transmitted on multiple beams.

POW component 1535 may power on a receiver of the UE during the POW and determine a first POW including multiple TTIs. In some cases, receiving the unicast paging message further includes: determining a POW associated with the unicast paging message. In some cases, the POW includes multiple TTIs. In some cases, the second POW includes multiple TTIs.

Staggering component 1540 may stagger the broadcast paging message for different UEs across different CET periods. In some cases, the broadcast paging message is staggered for different UEs across different POWs.

LBT component 1545 may perform the LBT procedure during a contention gap preceding the transmission of the random access request message.

Figure 16:
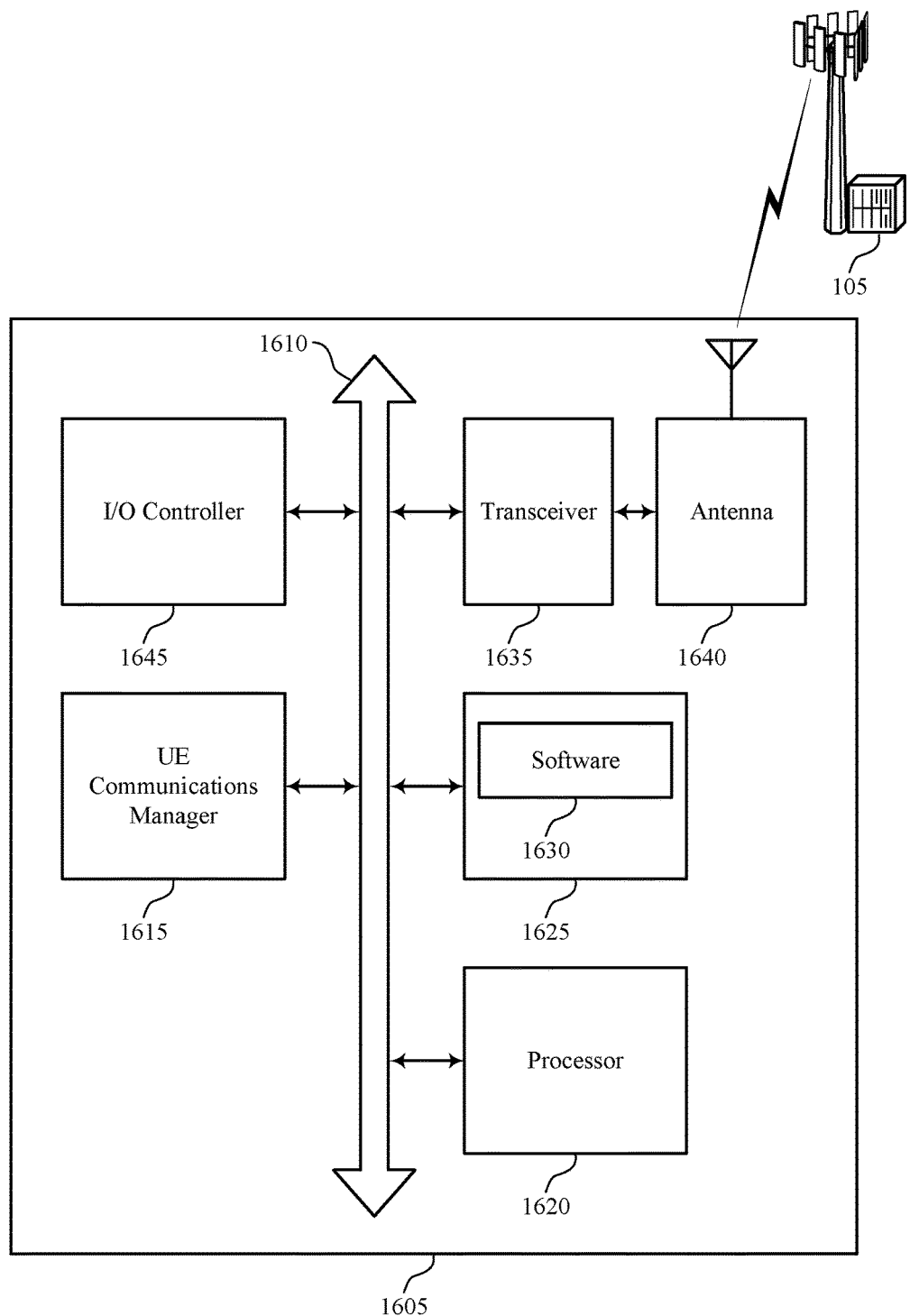
FIG. 16 illustrates a block diagram of a system including a UE that supports paging for mmW shared radio frequency spectrum bands in accordance with aspects of the present disclosure.

FIG. 16 shows a diagram of a system 1600 including a device 1605 that supports paging for mmW shared radio frequency spectrum band in accordance with various aspects of the present disclosure. Device 1605 may be an example of or include the components of UE 115 as described above, e.g., with reference to FIG. 1. Device 1605 may include components for bi-directional voice and data communications including components for transmitting and receiving communications, including UE communications manager 1615, processor 1620, memory 1625, software 1630, transceiver 1635, antenna 1640, and I/O controller 1645. These components may be in electronic communication via one or more busses (e.g., bus 1610). Device 1605 may communicate wirelessly with one or more base stations 105.

Processor 1620 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1620 may be configured to operate a memory array using a memory controller. In other cases, a memory controller may be integrated into processor 1620. Processor 1620 may be configured to execute computer-readable instructions stored in a memory to perform various functions (e.g., functions or tasks supporting paging for mmW shared radio frequency spectrum band).

Memory 1625 may include RAM and ROM. The memory 1625 may store computer-readable, computer-executable software 1630 including instructions that, when executed, cause the processor to perform various functions described herein. In some cases, the memory 1625 may contain, among other things, a BIOS which may control basic hardware and/or software operation such as the interaction with peripheral components or devices.

Software 1630 may include code to implement aspects of the present disclosure, including code to support paging for mmW shared radio frequency spectrum band. Software 1630 may be stored in a non-transitory computer-readable medium such as system memory or other memory. In some cases, the software 1630 may not be directly executable by the processor but may cause a computer (e.g., when compiled and executed) to perform functions described herein.

Transceiver 1635 may communicate bi-directionally, via one or more antennas, wired, or wireless links as described above. For example, the transceiver 1635 may represent a wireless transceiver and may communicate bi-directionally with another wireless transceiver. The transceiver 1635 may also include a modem to modulate the packets and provide the modulated packets to the antennas for transmission, and to demodulate packets received from the antennas.

In some cases, the wireless device may include a single antenna 1640. However, in some cases the device may have more than one antenna 1640, which may be capable of concurrently transmitting or receiving multiple wireless transmissions.

I/O controller 1645 may manage input and output signals for device 1605. I/O controller 1645 may also manage peripherals not integrated into device 1605. In some cases, I/O controller 1645 may represent a physical connection or port to an external peripheral. In some cases, I/O controller 1645 may utilize an operating system such as iOS®, ANDROID®, MS-DOS®, MS-WINDOWS®, OS/2®, UNIX®, LINUX®, or another known operating system. In other cases, I/O controller 1645 may represent or interact with a modem, a keyboard, a mouse, a touchscreen, or a similar device. In some cases, I/O controller 1645 may be implemented as part of a processor. In some cases, a user may interact with device 1605 via I/O controller 1645 or via hardware components controlled by I/O controller 1645.

Figure 17:
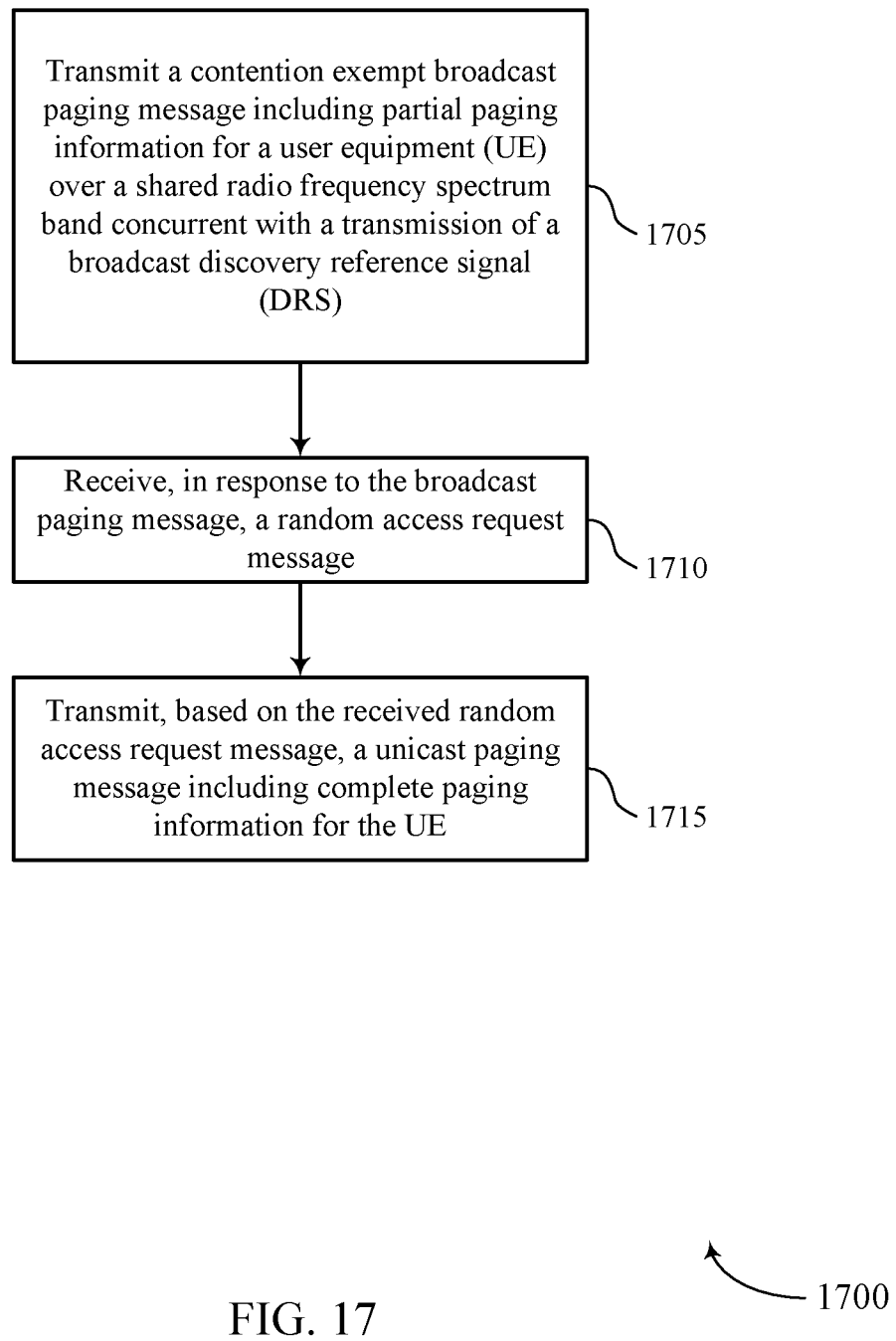
FIGS. 17 through 21 illustrate methods for paging for mmW shared radio frequency spectrum bands in accordance with aspects of the present disclosure.

FIG. 17 shows a flowchart illustrating a method 1700 for paging for mmW shared radio frequency spectrum band in accordance with various aspects of the present disclosure. The operations of method 1700 may be implemented by a base station 105 or its components as described herein. For example, the operations of method 1700 may be performed by a base station communications manager as described with reference to FIGS. 9 through 12. In some examples, a base station 105 may execute a set of codes to control the functional elements of the device to perform the functions described below. Additionally or alternatively, the base station 105 may perform aspects of the functions described below using special-purpose hardware.

At block 1705 the base station 105 may transmit a contention exempt broadcast paging message comprising partial paging information for a user equipment (UE) over a shared radio frequency spectrum band concurrent with a transmission of a broadcast discovery reference signal (DRS). The operations of block 1705 may be performed according to the methods described with reference to FIGS. 1 through 8. In certain examples, aspects of the operations of block 1705 may be performed by a broadcast paging component as described with reference to FIGS. 9 through 12, which may operate in cooperation with a transmitter 920 or 1020 as described with reference to FIG. 9 or 10, or antenna(s) 1240 and transceiver(s) 1235 as described with reference to FIG. 12.

At block 1710 the base station 105 may receive, in response to the broadcast paging message, a random access request message. The operations of block 1710 may be performed according to the methods described with reference to FIGS. 1 through 8. In certain examples, aspects of the operations of block 1710 may be performed by a random access request component as described with reference to FIGS. 9 through 12, which may operate in cooperation with a receiver 910 or 1010 as described with reference to FIG. 9 or 10, or antenna(s) 1240 and transceiver(s) 1235 as described with reference to FIG. 12.

At block 1715 the base station 105 may transmit, based on the received random access request message, a unicast paging message comprising complete paging information for the UE. The operations of block 1715 may be performed according to the methods described with reference to FIGS. 1 through 8. In certain examples, aspects of the operations of block 1715 may be performed by a unicast paging component as described with reference to FIGS. 9 through 12, which may operate in cooperation with a transmitter 920 or 1020 as described with reference to FIG. 9 or 10, or antenna(s) 1240 and transceiver(s) 1235 as described with reference to FIG. 12.

Figure 18:
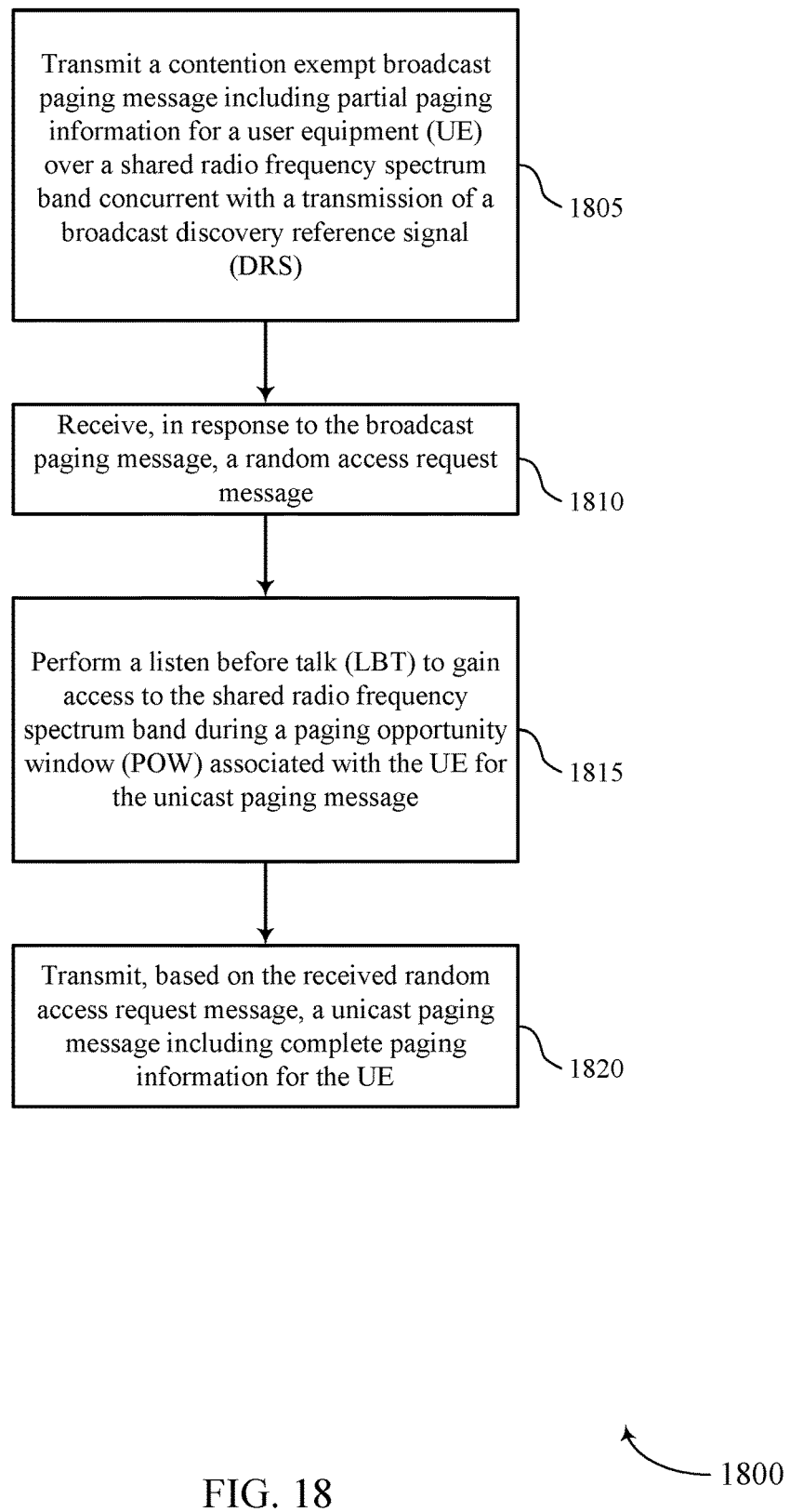

FIG. 18 shows a flowchart illustrating a method 1800 for paging for mmW shared radio frequency spectrum band in accordance with various aspects of the present disclosure. The operations of method 1800 may be implemented by a base station 105 or its components as described herein. For example, the operations of method 1800 may be performed by a base station communications manager as described with reference to FIGS. 9 through 12. In some examples, a base station 105 may execute a set of codes to control the functional elements of the device to perform the functions described below. Additionally or alternatively, the base station 105 may perform aspects of the functions described below using special-purpose hardware.

At block 1805 the base station 105 may transmit a contention exempt broadcast paging message comprising partial paging information for a user equipment (UE) over a shared radio frequency spectrum band concurrent with a transmission of a broadcast discovery reference signal (DRS). The operations of block 1805 may be performed according to the methods described with reference to FIGS. 1 through 8. In certain examples, aspects of the operations of block 1805 may be performed by a broadcast paging component as described with reference to FIGS. 9 through 12, which may operate in cooperation with a transmitter 920 or 1020 as described with reference to FIG. 9 or 10, or antenna(s) 1240 and transceiver(s) 1235 as described with reference to FIG. 12.

At block 1810 the base station 105 may receive, in response to the broadcast paging message, a random access request message. The operations of block 1810 may be performed according to the methods described with reference to FIGS. 1 through 8. In certain examples, aspects of the operations of block 1810 may be performed by a random access request component as described with reference to FIGS. 9 through 12, which may operate in cooperation with a receiver 910 or 1010 as described with reference to FIG. 9 or 10, or antenna(s) 1240 and transceiver(s) 1235 as described with reference to FIG. 12.

At block 1815 the base station 105 may perform a listen before talk (LBT) to gain access to the shared radio frequency spectrum band during a paging opportunity window (POW) associated with the UE for the unicast paging message. The operations of block 1815 may be performed according to the methods described with reference to FIGS. 1 through 8. In certain examples, aspects of the operations of block 1815 may be performed by a POW component as described with reference to FIGS. 9 through 12.

At block 1820 the base station 105 may transmit, based on the received random access request message, a unicast paging message comprising complete paging information for the UE. The operations of block 1820 may be performed according to the methods described with reference to FIGS. 1 through 8. In certain examples, aspects of the operations of block 1820 may be performed by a unicast paging component as described with reference to FIGS. 9 through 12, which may operate in cooperation with a transmitter 920 or 1020 as described with reference to FIG. 9 or 10, or antenna(s) 1240 and transceiver(s) 1235 as described with reference to FIG. 12.

Figure 19:
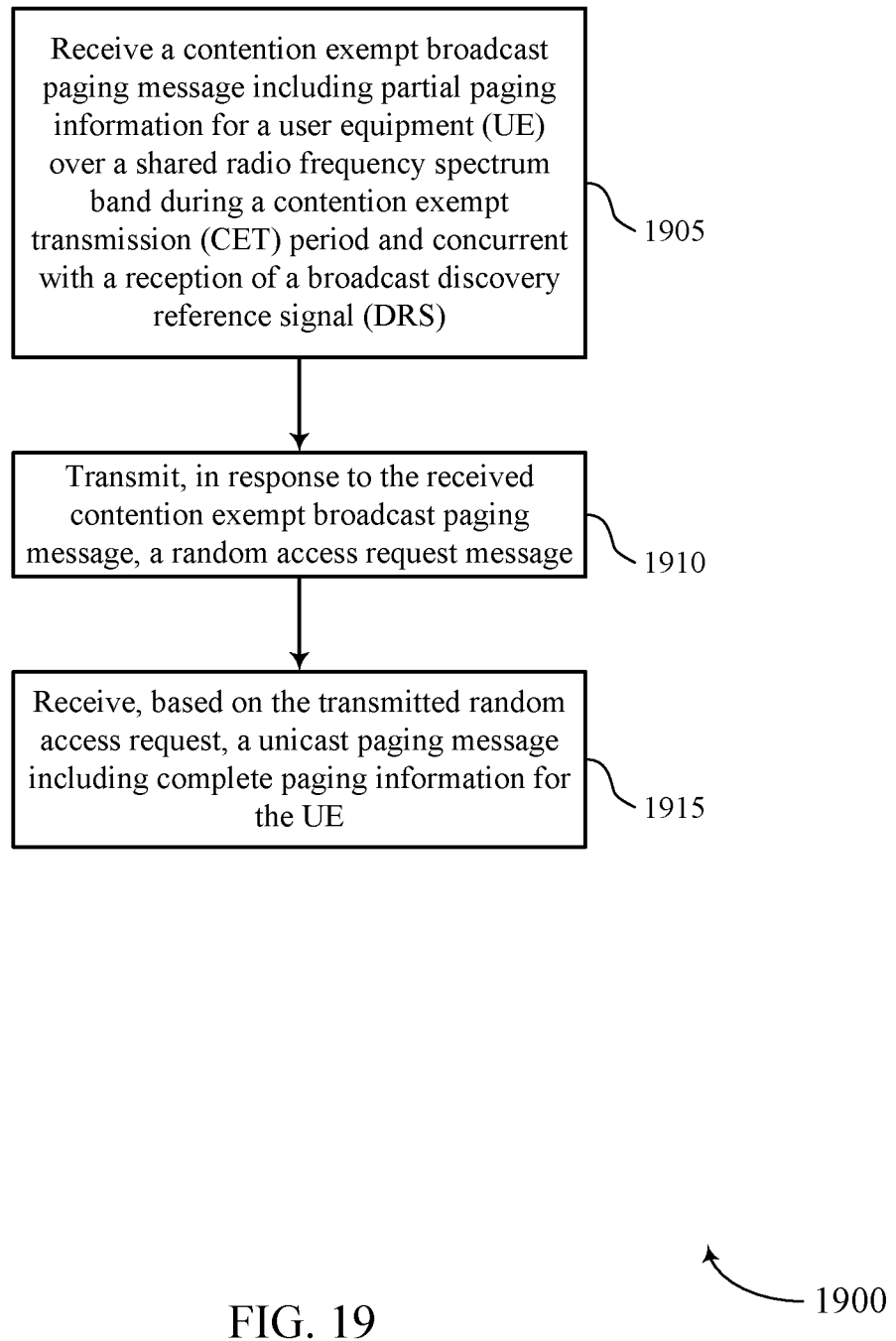

FIG. 19 shows a flowchart illustrating a method 1900 for paging for mmW shared radio frequency spectrum band in accordance with various aspects of the present disclosure. The operations of method 1900 may be implemented by a UE 115 or its components as described herein. For example, the operations of method 1900 may be performed by a UE communications manager as described with reference to FIGS. 13 through 16. In some examples, a UE 115 may execute a set of codes to control the functional elements of the device to perform the functions described below. Additionally or alternatively, the UE 115 may perform aspects of the functions described below using special-purpose hardware.

At block 1905 the UE 115 may receive a contention exempt broadcast paging message comprising partial paging information for the user equipment (UE) over a shared radio frequency spectrum band during a contention exempt transmission (CET) period and concurrent with a reception of a broadcast discovery reference signal (DRS). The operations of block 1905 may be performed according to the methods described with reference to FIGS. 1 through 8. In certain examples, aspects of the operations of block 1905 may be performed by a broadcast paging component as described with reference to FIGS. 13 through 16, which may operate in cooperation with a receiver 1310 or 1410 as described with reference to FIG. 13 or 14, or antenna(s) 1640 and transceiver(s) 1635 as described with reference to FIG. 16.

At block 1910 the UE 115 may transmit, in response to the received contention exempt broadcast paging message, a random access request message. The operations of block 1910 may be performed according to the methods described with reference to FIGS. 1 through 8. In certain examples, aspects of the operations of block 1910 may be performed by a random access request component as described with reference to FIGS. 13 through 16, which may operate in cooperation with a transmitter 1320 or 1420 as described with reference to FIG. 13 or 14, or antenna(s) 1640 and transceiver(s) 1635 as described with reference to FIG. 16.

At block 1915 the UE 115 may receive, based on the transmitted random access request, a unicast paging message comprising complete paging information for the UE. The operations of block 1915 may be performed according to the methods described with reference to FIGS. 1 through 8. In certain examples, aspects of the operations of block 1915 may be performed by a unicast paging component as described with reference to FIGS. 13 through 16, which may operate in cooperation with a receiver 1310 or 1410 as described with reference to FIG. 13 or 14, or antenna(s) 1640 and transceiver(s) 1635 as described with reference to FIG. 16.

Figure 20:
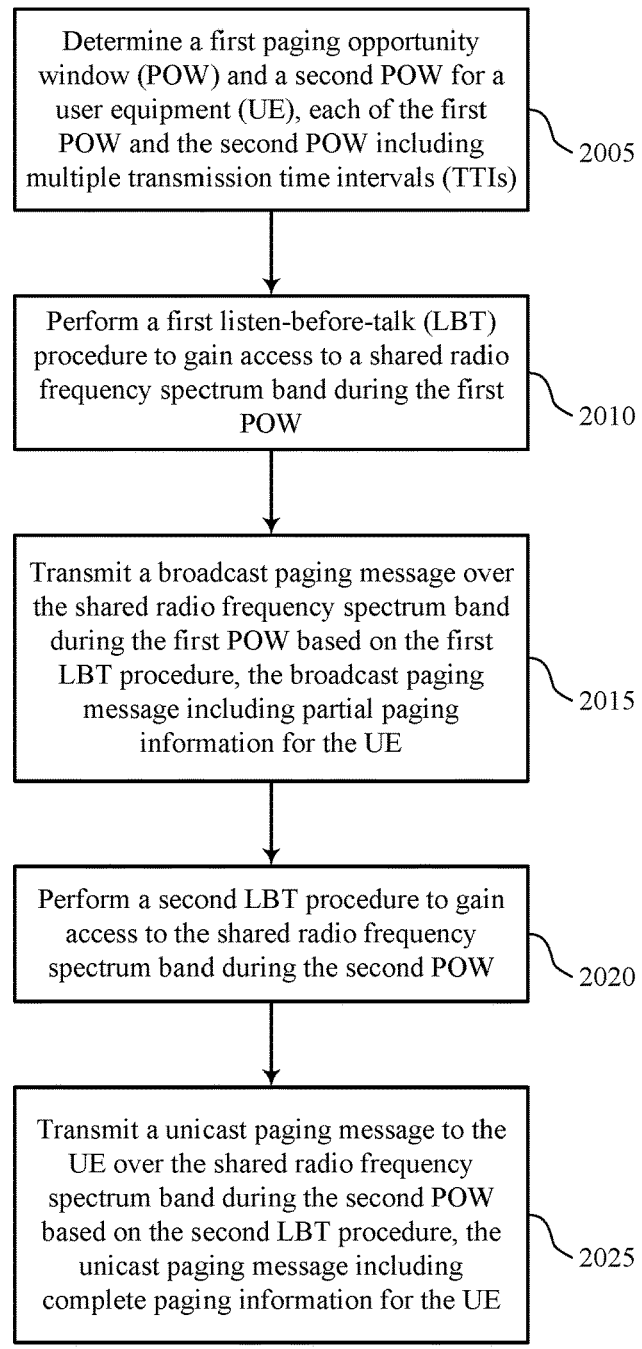

FIG. 20 shows a flowchart illustrating a method 2000 for paging for mmW shared radio frequency spectrum band in accordance with various aspects of the present disclosure. The operations of method 2000 may be implemented by a base station 105 or its components as described herein. For example, the operations of method 2000 may be performed by a base station communications manager as described with reference to FIGS. 9 through 12. In some examples, a base station 105 may execute a set of codes to control the functional elements of the device to perform the functions described below. Additionally or alternatively, the base station 105 may perform aspects of the functions described below using special-purpose hardware.

At block 2005 the base station 105 may determine a first paging opportunity window (POW) and a second POW for a user equipment (UE), each of the first POW and the second POW comprising multiple transmission time intervals (TTIs). The operations of block 2005 may be performed according to the methods described with reference to FIGS. 1 through 8. In certain examples, aspects of the operations of block 2005 may be performed by a POW component as described with reference to FIGS. 9 through 12.

At block 2010 the base station 105 may perform a first listen-before-talk (LBT) procedure to gain access to a shared radio frequency spectrum band during the first POW. The operations of block 2010 may be performed according to the methods described with reference to FIGS. 1 through 8. In certain examples, aspects of the operations of block 2010 may be performed by a LBT component as described with reference to FIGS. 9 through 12.

At block 2015 the base station 105 may transmit a broadcast paging message over the shared radio frequency spectrum band during the first POW based on the first LBT procedure, the broadcast paging message comprising partial paging information for the UE. The operations of block 2015 may be performed according to the methods described with reference to FIGS. 1 through 8. In certain examples, aspects of the operations of block 2015 may be performed by a broadcast paging component as described with reference to FIGS. 9 through 12, which may operate in cooperation with a transmitter 920 or 1020 as described with reference to FIG. 9 or 10, or antenna(s) 1240 and transceiver(s) 1235 as described with reference to FIG. 12.

At block 2020 the base station 105 may perform a second LBT procedure to gain access to the shared radio frequency spectrum band during the second POW. The operations of block 2020 may be performed according to the methods described with reference to FIGS. 1 through 8. In certain examples, aspects of the operations of block 2020 may be performed by a LBT component as described with reference to FIGS. 9 through 12.

At block 2025 the base station 105 may transmit a unicast paging message to the UE over the shared radio frequency spectrum band during the second POW based on the second LBT procedure, the unicast paging message comprising complete paging information for the UE. The operations of block 2025 may be performed according to the methods described with reference to FIGS. 1 through 8. In certain examples, aspects of the operations of block 2025 may be performed by a unicast paging component as described with reference to FIGS. 9 through 12, which may operate in cooperation with a transmitter 920 or 1020 as described with reference to FIG. 9 or 10, or antenna(s) 1240 and transceiver(s) 1235 as described with reference to FIG. 12.

Figure 21:
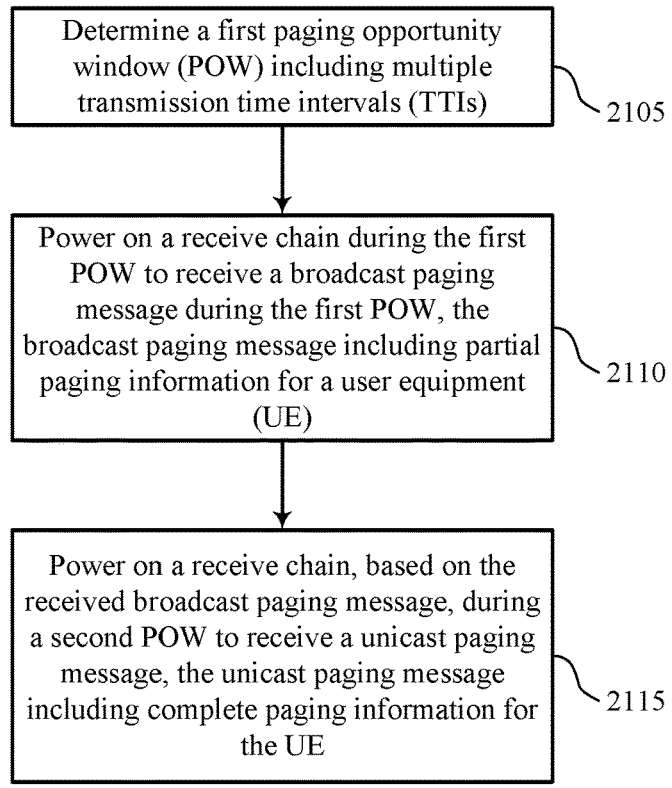

FIG. 21 shows a flowchart illustrating a method 2100 for paging for mmW shared radio frequency spectrum band in accordance with various aspects of the present disclosure. The operations of method 2100 may be implemented by a UE 115 or its components as described herein. For example, the operations of method 2100 may be performed by a UE communications manager as described with reference to FIGS. 13 through 16. In some examples, a UE 115 may execute a set of codes to control the functional elements of the device to perform the functions described below. Additionally or alternatively, the UE 115 may perform aspects of the functions described below using special-purpose hardware.

At block 2105 the UE 115 may determine a first paging opportunity window (POW) comprising multiple transmission time intervals (TTIs). The operations of block 2105 may be performed according to the methods described with reference to FIGS. 1 through 8. In certain examples, aspects of the operations of block 2105 may be performed by a POW component as described with reference to FIGS. 13 through 16.

At block 2110 the UE 115 may power on a receive chain during the first POW to receive a broadcast paging message during the first POW, the broadcast paging message comprising partial paging information for the UE. The operations of block 2110 may be performed according to the methods described with reference to FIGS. 1 through 8. In certain examples, aspects of the operations of block 2110 may be performed by a broadcast paging component as described with reference to FIGS. 13 through 16.

At block 2115 the UE 115 may power on a receive chain, based on the received broadcast paging message, during a second POW to receive a unicast paging message, the unicast paging message comprising complete paging information for the UE. The operations of block 2115 may be performed according to the methods described with reference to FIGS. 1 through 8. In certain examples, aspects of the operations of block 2115 may be performed by a unicast paging component as described with reference to FIGS. 13 through 16.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM).

An orthogonal frequency division multiple access (OFDMA) system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-Advanced (LTE-A) are releases of Universal Mobile Telecommunications System (UMTS) that use E-UTRA. UTRA, E-UTRA, UMTS, LTE, LTE-A, NR, and Global System for Mobile communications (GSM) are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of evolved node B (eNBs) provide coverage for various geographical regions. For example, each eNB, gNB or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), next generation NodeB (gNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
receiving a contention exempt broadcast paging message comprising partial paging information for a user equipment (UE) over a shared radio frequency spectrum band during a contention exempt transmission (CET) period and concurrent with a reception of a broadcast discovery reference signal (DRS);
transmitting, in response to the received contention exempt broadcast paging message, a random access request message; and
receiving, based on the transmitted random access request, a unicast paging message comprising complete paging information for the UE.

2. The method of claim 1, wherein:
the contention exempt broadcast paging message is staggered for different UEs across different CET periods.

3. The method of claim 1, wherein:
the contention exempt broadcast paging message is frequency domain multiplexed with the broadcast DRS.

4. The method of claim 1, wherein:
receiving the contention exempt broadcast paging message further comprises:
obtaining from the broadcast DRS an indication of a CET random access channel (RACH) location for the UE.

5. The method of claim 1, wherein:
the partial paging information comprises an indication that the unicast paging message is to be transmitted to the UE.

6. The method of claim 1, wherein:
the random access request message comprises a CET.

7. The method of claim 1, wherein:
transmitting the random access request message further comprises: performing a listen before talk (LBT) procedure to gain access to the shared radio frequency spectrum band prior to transmitting the random access request message.

8. The method of claim 7, wherein:
transmitting the random access request message further comprises: performing the LBT procedure during a contention gap preceding the transmission of the random access request message.

9. The method of claim 1, wherein:
receiving the unicast paging message further comprises: determining a paging opportunity window (POW) associated with the unicast paging message; and
the method further comprising powering on a receive chain of the UE during the POW.

10. The method of claim 9, wherein:
the POW comprises multiple transmission time intervals (TTIs).

11. The method of claim 1, wherein:
the complete paging information comprises an indication of downlink resources associated with a future transmission from a base station to the UE.

12. The method of claim 1, wherein:
the transmission of the unicast paging message is beam-specific.

13. An apparatus for wireless communication, comprising:
a processor;
memory in electronic communication with the processor; and
instructions stored in the memory, wherein the instructions are executable by the processor to:

receive a contention exempt broadcast paging message comprising partial paging information for a user equipment (UE) over a shared radio frequency spectrum band concurrent with a reception of a broadcast discovery reference signal (DRS);

transmit, in response to the received contention exempt broadcast paging message, a random access request message; and receive, based on the transmitted random access request, a unicast paging message comprising complete paging information for the UE.

14. The apparatus of claim 13, wherein:
the contention exempt broadcast paging message is staggered for different UEs across different CET periods.

15. The apparatus of claim 13, wherein:
the contention exempt broadcast paging message is frequency domain multiplexed with the broadcast DRS.

16. The apparatus of claim 13, wherein the instructions executable by the processor to receive the contention exempt broadcast paging message comprise instructions executable by the processor to:
obtain from the broadcast DRS an indication of a CET random access channel (RACH) location for the UE.

17. The apparatus of claim 13, wherein:
the partial paging information comprises an indication that the unicast paging message is to be transmitted to the UE.

18. The apparatus of claim 13, wherein:
the random access request message comprises a CET.

19. The apparatus of claim 13, wherein the instructions executable by the processor to transmit the random access request message comprise instructions executable by the processor to:
perform a listen before talk (LBT) procedure to gain access to the shared radio frequency spectrum band prior to transmitting the random access request message.

20. The apparatus of claim 19, wherein the instructions executable by the processor to transmit the random access request message further comprises instructions executable by the processor to:
perform the LBT procedure during a contention gap preceding the transmission of the random access request message.

21. The apparatus of claim 13, wherein the instructions executable by the processor to receive the unicast paging message comprise instructions executable by the processor to:
determine a paging opportunity window (POW) associated with the unicast paging message; and
the instructions are further executable by the processor to power on a receive chain of the UE during the POW.

22. The apparatus of claim 21, wherein:
the POW comprises multiple transmission time intervals (TTIs).

23. The apparatus of claim 13, wherein:
the transmission of the unicast paging message is beam-specific.

24. The apparatus of claim 13, wherein:
the complete paging information comprises an indication of downlink resources associated with a future transmission from a base station to the UE.

25. An apparatus for wireless communication, comprising:
means for receiving a contention exempt broadcast paging message comprising partial paging information for a user equipment (UE) over a shared radio frequency spectrum band during a contention exempt transmission (CET) period and concurrent with a reception of a broadcast discovery reference signal (DRS);
means for transmitting, in response to the received contention exempt broadcast paging message, a random access request message; and
means for receiving, based on the transmitted random access request, a unicast paging message comprising complete paging information for the UE.

26. The apparatus of claim 25, wherein:
the contention exempt broadcast paging message is staggered for different UEs across different CET periods.

27. The apparatus of claim 25, wherein:
the contention exempt broadcast paging message is frequency domain multiplexed with the broadcast DRS.

28. The apparatus of claim 25, wherein:
receiving the contention exempt broadcast paging message further comprises: obtaining from the broadcast DRS an indication of a CET random access channel (RACH) location for the UE.

29. The apparatus of claim 25, wherein:
the partial paging information comprises an indication that the unicast paging message is to be transmitted to the UE.

30. A non-transitory computer-readable medium storing code for wireless communication at a user equipment (UE), the code comprising instructions executable to:
receive a contention exempt broadcast paging message comprising partial paging information for the UE over a shared radio frequency spectrum band during a contention exempt transmission (CET) period and concurrent with a reception of a broadcast discovery reference signal (DRS);
transmit, in response to the received contention exempt broadcast paging message, a random access request message; and
receive, based on the transmitted random access request, a unicast paging message comprising complete paging information for the UE.

* * * * *